(12) United States Patent
Gu et al.

(10) Patent No.: US 12,437,695 B2
(45) Date of Patent: Oct. 7, 2025

(54) DISPLAY SUBSTRATE WITH REUSING CIRCUIT, AND DRIVING METHOD THEREFOR, AND DISPLAY APPARATUS

(71) Applicant: BOE Technology Group Co., Ltd., Beijing (CN)

(72) Inventors: Zhaoyun Gu, Beijing (CN); Shuhuan Yu, Beijing (CN); Rui Liu, Beijing (CN); Xin Duan, Beijing (CN); Kexin Hao, Beijing (CN); Shaoru Zhang, Beijing (CN); Bin Wang, Beijing (CN); Shaolei Zong, Beijing (CN); Jiantao Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/580,700

(22) PCT Filed: Nov. 29, 2021

(86) PCT No.: PCT/CN2021/133903
§ 371 (c)(1),
(2) Date: Jan. 19, 2024

(87) PCT Pub. No.: WO2023/092539
PCT Pub. Date: Jun. 1, 2023

(65) Prior Publication Data
US 2024/0339065 A1    Oct. 10, 2024

(51) Int. Cl.
*G09G 3/20*      (2006.01)
(52) U.S. Cl.
CPC ... *G09G 3/2074* (2013.01); *G09G 2310/0275* (2013.01); *G09G 2310/0291* (2013.01)

(58) Field of Classification Search
CPC ......... G09G 3/2074; G09G 2310/0275; G09G 2310/0291; G09G 3/003;
(Continued)

(56) References Cited

U.S. PATENT DOCUMENTS

2010/0245325 A1    9/2010    Xiao et al.
2015/0213757 A1    7/2015    Takahama et al.
(Continued)

FOREIGN PATENT DOCUMENTS

CN    101847378 A    9/2010
CN    102854648 A    1/2013
(Continued)

OTHER PUBLICATIONS

Extended European Search Report, mailed Jul. 8, 2024, from European Application No. 21965272.4, 13 pages.
(Continued)

*Primary Examiner* — David D Davis
(74) *Attorney, Agent, or Firm* — Workman Nydegger

(57) ABSTRACT

A display substrate includes: a base substrate including a display area and a frame area; pixel islands arranged in an array in the display area, each pixel island having sub-pixels arranged in an array; data lines extending in a column direction and arranged along a row direction in the display area, the data lines being electrically connected to the sub-pixels; operational amplifiers in the frame area, each operational amplifier being electrically connected to a column of sub-pixels through the data line(s); and reusing circuits in the frame area, each reusing circuit being connected to at least two operational amplifiers, and sub-pixels electrically connected to each reusing circuit through data lines being in at least two columns.

15 Claims, 10 Drawing Sheets

(58) Field of Classification Search
CPC ... G09G 2310/0297; G09G 2300/0426; H10K 59/131; H10D 86/40; H10D 86/60
See application file for complete search history.

(56) References Cited

U.S. PATENT DOCUMENTS

| | | | | |
|---|---|---|---|---|
| 2015/0319427 | A1* | 11/2015 | Wu | H04N 13/315 345/426 |
| 2016/0274373 | A1* | 9/2016 | Suzuki | G02B 30/27 |
| 2017/0032755 | A1 | 2/2017 | Ko et al. | |
| 2017/0336851 | A1* | 11/2017 | Bae | G09G 3/2003 |
| 2018/0211579 | A1* | 7/2018 | Bae | G09G 3/2003 |
| 2018/0268780 | A1 | 9/2018 | Bae et al. | |
| 2020/0193894 | A1* | 6/2020 | Bae | G09G 3/3607 |
| 2021/0020135 | A1 | 1/2021 | Yang et al. | |
| 2021/0280116 | A1 | 9/2021 | Peng et al. | |
| 2022/0328016 | A1 | 10/2022 | Wang et al. | |

FOREIGN PATENT DOCUMENTS

| | | |
|---|---|---|
| CN | 104392685 A | 3/2015 |
| CN | 104520918 A | 4/2015 |
| CN | 105187035 A | 12/2015 |
| CN | 105528988 A | 4/2016 |
| CN | 106356032 A | 1/2017 |
| CN | 111261125 A | 6/2020 |
| CN | 112242127 A | 1/2021 |
| CN | 113282175 A | 8/2021 |
| KR | 20170014352 A | 2/2017 |
| WO | 2020248839 A1 | 12/2020 |

OTHER PUBLICATIONS

International Search Report, mailed Aug. 15, 2022, from PCT International Application No. PCT/CN2021/133903, 4 pages.

* cited by examiner

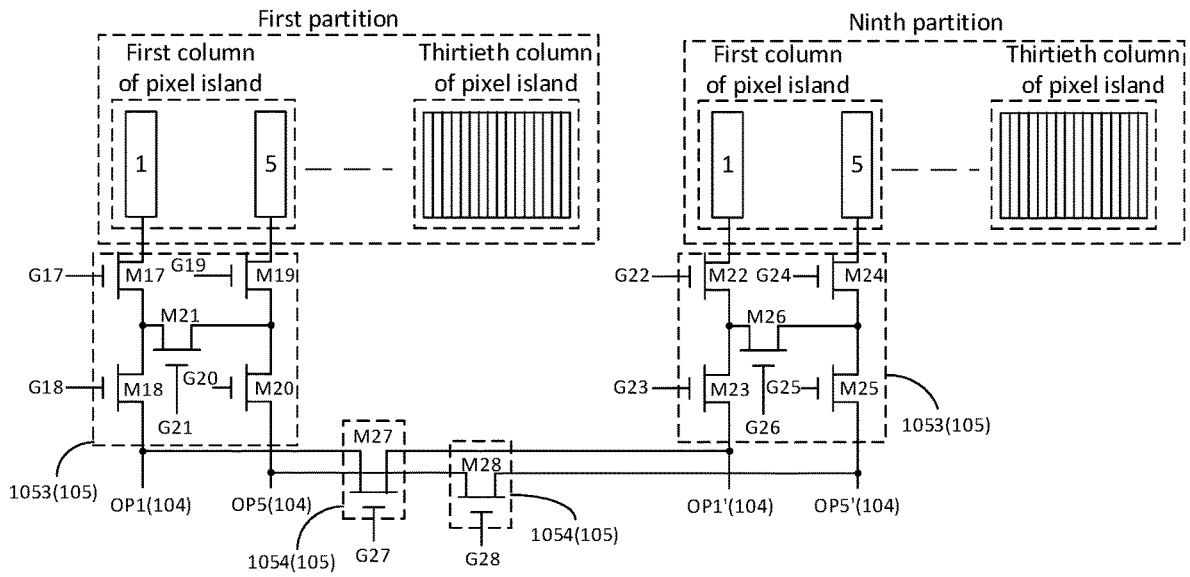

FIG. 16

| in a reusing mode, controlling each reusing circuit to conduct one of the data lines that are electrically connected to the reusing circuit, and disconnecting the other data lines that are electrically connected to the reusing circuit, so that data signals output by at least two operational amplifiers are provided to sub-pixels in a same column that is electrically connected to the conducted data line through the reusing circuit and the conducted data line |
|---|

S1701

↓

| in a non-reusing mode, controlling each reusing circuit to disconnect all data lines electrically connected to the reusing circuit, so as to provide each data signal output by each operational amplifier to each column of sub-pixels electrically connected to each operational amplifier in a one-to-one correspondence |
|---|

DISPLAY SUBSTRATE WITH REUSING CIRCUIT, AND DRIVING METHOD THEREFOR, AND DISPLAY APPARATUS

CROSS-REFERENCE TO RELATED APPLICATIONS

The present application is a National Stage of International Application No. PCT/CN2021/133903, filed Nov. 29, 2021, the entire contents of which are incorporated in the present application by reference.

TECHNICAL FIELD

The present disclosure relates to the field of display technology, and in particular to a display substrate, a driving method therefor, and a display apparatus.

BACKGROUND

Naked-eye three-dimensional (3D) technology refers to a 3D display technology with which spatial and depth perception can be achieved without any auxiliary equipment. As users have higher and higher requirements for viewing experience, naked-eye 3D display technology is gradually being applied to display screens.

SUMMARY

Detailed implementations for a display substrate, a driving method therefor and a display device provided by some embodiments of the disclosure are as following.

In one aspect, some embodiments of the present disclosure provide a display substrate, including:
- a base substrate including a display area and a frame area located on at least one side of the display area;
- a plurality of pixel islands arranged in an array in the display area; where each of the pixel islands includes a plurality of sub-pixels arranged in an array;
- a plurality of data lines extending along a column direction and arranged along a row direction in the display area, the plurality of data lines being electrically connected to the sub-pixels;
- a plurality of operational amplifiers located in the frame area; where each operational amplifier is electrically connected to a column of sub-pixels through the data line(s);
- a plurality of reusing circuits located in the frame area; where each reusing circuit is connected to at least two operational amplifiers, and the sub-pixels electrically connected to each reusing circuit through the data lines are located in at least two columns.

In some embodiments, in the display substrate provided by the present disclosure, at least two adjacent columns of the pixel islands in the row direction form a partition;
- each of the reusing circuits includes a first sub-reusing circuit, and the sub-pixels electrically connected to each first sub-reusing circuit are located in at least two of the partitions.

In some embodiments, in the display substrate provided by the present disclosure, each of the first sub-reusing circuits is connected among two operational amplifiers and the data lines to which the two operational amplifiers are electrically connected, and the sub-pixels electrically connected to each of the first sub-reusing circuits are in two of the partitions.

In some embodiments, in the display substrate provided by the present disclosure, there are 2n partitions in the row direction, where n is a positive integer;
- first to $n^{th}$ partitions arranged continuously are a watching area, and $(n+1)^{th}$ to $2n^{th}$ partitions arranged continuously are a non-watching area;
- the sub-pixels electrically connected to each of the first sub-reusing circuits are located in the $m^{th}$ and $(m+n)^{th}$ partitions, where m is an integer greater than or equal to 1 and less than or equal to n.

In some embodiments, in the display substrate provided by the present disclosure, each of the partitions includes i columns of pixel islands, where i is an integer greater than or equal to 2;
- the sub-pixels electrically connected to each of the first sub-reusing circuits are located in a $j^{th}$ column of pixel island in the $m^{th}$ partition and the $j^{th}$ column of pixel island in the $(m+n)^{th}$ partition, j is an integer greater than or equal to 1 and less than or equal to i.

In some embodiments, in the display substrate provided by the present disclosure, each of the pixel islands includes k sub-pixels arranged in a single row, where k is an even number;
- the sub-pixels electrically connected to each of the first sub-reusing circuits are at least part of the sub-pixels in a $h^{th}$ column of a $j^{th}$ column of the pixel island in a $m^{th}$ partition, and at least part of the sub-pixels in the $h^{th}$ column of the $j^{th}$ column of the pixel island in a $(m+n)^{th}$ partition, wherein h is an integer greater than or equal to 1 and less than or equal to k.

In some embodiments, in the display substrate provided by the present disclosure, one of the data lines is connected between one of the operational amplifiers and one column of the sub-pixels.

In some embodiments, in the display substrate provided by the present disclosure, the sub-pixels electrically connected to each of the first sub-reusing circuits are the sub-pixels in the $h^{th}$ column of the $j^{th}$ column of the pixel island in the $m^{th}$ partition, and the sub-pixels in the $h^{th}$ column of the $j^{th}$ column of the pixel island in the $(m+n)^{th}$ partition.

In some embodiments, in the display substrate provided by the present disclosure, each of the reusing circuit further includes a second sub-reusing circuit;
- each second sub-reusing circuit is connected between two columns of sub-pixels in a same column of the pixel island and two first sub-reusing circuits corresponding to the two columns of sub-pixels.

In some embodiments, in the display substrate provided by the present disclosure, k is a multiple of 4, h is an integer greater than or equal to 1 and less than or equal to k/4, and an integer greater than or equal to (1+k/4) and less than or equal to (k−4);
- each of the second sub-reusing circuits is electrically connected to the sub-pixels in the $h^{th}$ column and the $(h+k/4)^{th}$ column of the same column of pixel island, respectively.

In some embodiments, in the display substrate provided by the present disclosure, each of the first sub-reusing circuits which is connected to the $h^{th}$ column of sub-pixels in the $j^{th}$ column of pixel island in the $m^{th}$ partition and the $h^{th}$ column of sub-pixels in the $j^{th}$ column of pixel island in the $(m+n)^{th}$ partition, includes a first transistor, a second transistor and a third transistor;
- each of the first sub-reusing circuits which is connected to the $(h+k/4)^{th}$ column of sub-pixels in the $j^{th}$ column of pixel island in the $m^{th}$ partition and the $(h+k/4)^{th}$ column of sub-pixels in the $j^{th}$ column of pixel island in the $(m+n)^{th}$ partition, includes a fourth transistor, a fifth transistor and a sixth transistor;

each of the second sub-reusing circuits which is connected to the $h^{th}$ and $(h+k/4)^{th}$ columns of sub-pixels in the $j^{th}$ column o pixel island in the $m^{th}$ partition, includes a seventh transistor, a eighth transistor and a ninth transistor;

each of the second sub-reusing circuits which is connected to the $h^{th}$ and $(h+k/4)^{th}$ columns of sub-pixels in the $j^{th}$ column o pixel island in the $(m+n)^{th}$ partition, includes a tenth transistor, an eleventh transistor and a twelfth transistor;

wherein a gate electrode of the first transistor is electrically connected to a first control signal terminal, and a first electrode of the first transistor is connected to an operational amplifier corresponding to the $h^{th}$ column of sub-pixels in the $j^{th}$ column of pixel island in the $(m+n)^{th}$ partition, a second electrode of the first transistor is electrically connected to an operational amplifier corresponding to the $h^{th}$ column of sub-pixels in the $j^{th}$ column of pixel island in the $m^{th}$ partition;

a gate electrode of the second transistor is electrically connected to a second control signal terminal, a first electrode of the second transistor is electrically connected to the second electrode of the first transistor, and a second electrode of the second transistor is electrically connected to a first electrode of the seventh transistor;

a gate electrode of the third transistor is electrically connected to a third control signal terminal, a first electrode of the third transistor is electrically connected to the first electrode of the first transistor, and a second electrode of the third transistor is electrically connected to a first electrode of the tenth transistor;

a gate electrode of the fourth transistor is electrically connected to a fourth control signal terminal, and a first electrode of the fourth transistor is electrically connected to an operational amplifier corresponding to the $(h+k/4)^{th}$ column of sub-pixels in the $j^{th}$ column of pixel island in the $(m+n)^{th}$ partition, and a second electrode of the fourth transistor is electrically connected to an operational amplifier corresponding to the $(h+k/4)^{th}$ column of sub-pixels in the $j^{th}$ column of pixel island in the $m^{th}$ partition;

a gate electrode of the fifth transistor is electrically connected to a fifth control signal terminal, a first electrode of the fifth transistor is electrically connected to the second electrode of the fourth transistor, and a second electrode of the fifth transistor is electrically connected to a first electrode of the eighth transistor;

a gate electrode of the sixth transistor is electrically connected to a sixth control signal terminal, a second electrode of the sixth transistor is electrically connected to a first electrode of the eleventh transistor, and a first electrode of the sixth transistor is electrically connected to the first electrode of the fourth transistor;

a gate electrode of the seventh transistor is electrically connected to a seventh control signal terminal, and a second electrode of the seventh transistor is electrically connected to a data line corresponding to the $h^{th}$ column of sub-pixels in the $j^{th}$ column of pixel island in the $m^{th}$ partition;

a gate electrode of the eighth transistor is electrically connected to an eighth control signal terminal, and a second electrode of the eighth transistor is electrically connected to a data line corresponding to the $(h+k/4)^{th}$ column of sub-pixels in the $j^{th}$ column of pixel island in the $m^{th}$ partition;

a gate electrode of the ninth transistor is electrically connected to a ninth control signal terminal, a first electrode of the ninth transistor is electrically connected to the second electrode of the fifth transistor, and a second electrode of the ninth transistor is electrically connected to the second electrode of the second transistor;

a gate electrode of the tenth transistor is electrically connected to a tenth control signal terminal, and a second electrode of the tenth transistor is electrically connected to a data line corresponding to the $h^{th}$ column of sub-pixels in the $j^{th}$ column of pixel island in the $(m+n)^{th}$ partition;

a gate electrode of the eleventh transistor is electrically connected to an eleventh control signal terminal, and a second electrode of the eleventh transistor is electrically connected to a data line corresponding to the $(h+k/4)^{th}$ column of sub-pixels in the $j^{th}$ column of pixel island in the $(m+n)^{th}$ partition;

a gate of the twelfth transistor is electrically connected to a twelfth control signal terminal, a first electrode of the twelfth transistor is electrically connected to the second electrode of the sixth transistor, and a second electrode of the twelfth transistor electrically connected to the second electrode of the third transistor.

In some embodiments, in the display substrate provided by the present disclosure, two data lines are connected between one operational amplifier and one column of sub-pixels, and one of the two data lines is connected to odd-numbered rows of sub-pixels in the one column, the other one of the two data lines is connected to even-numbered rows of sub-pixels in the one column.

In some embodiments, in the display substrate provided by the present disclosure, sub-pixels electrically connected to each of the first sub-reusing circuits are even-numbered rows of sub-pixels in the $h^{th}$ column of the $j^{th}$ column of pixel island in the $m^{th}$ partition, and even-numbered rows of sub-pixels in the $h^{th}$ of the $j^{th}$ column of pixel island in the $(m+n)^{th}$ partition.

In some embodiments, in the display substrate provided by the present disclosure, each of the first sub-reusing circuits includes: a thirteenth transistor and a fourteenth transistor;

wherein a gate electrode of the thirteenth transistor is electrically connected to a thirteenth control signal terminal, and a first electrode of the thirteenth transistor is electrically connected to an operational amplifier corresponding to the $h^{th}$ column of sub-pixels in the $j^{th}$ column of pixel island in the $m^{th}$ partition, and a second electrode of the thirteenth transistor is electrically connected to a data line corresponding to the even-numbered rows of sub-pixels in the $h^{th}$ column of the $j^{th}$ column of pixel island in the $(m+n)^{th}$ partition;

a gate electrode of the fourteenth transistor is electrically connected to a fourteenth control signal terminal, and a first electrode of the fourteenth transistor is electrically connected to an operational amplifier corresponding to the $h^{th}$ column of sub-pixels in the $j^{th}$ column of pixel island in the $(m+n)^{th}$ partition, and a second electrode of the fourteenth transistor is electrically connected to a data line corresponding to the even-numbered rows of sub-pixels in the $h^{th}$ column of the $j^{th}$ column of pixel island in the $m^{th}$ partition.

In some embodiments, the display substrate provided by the present disclosure, further including a plurality of gating circuits in the frame area;

each of the plurality of gating circuits is connected among one operational amplifier and two data lines corresponding to the one operational amplifier.

In some embodiments, in the display substrate provided by the present disclosure, each of the plurality of gating circuits includes a fifteenth transistor and a sixteenth transistor;

wherein a gate of the fifteenth transistor is electrically connected to a fifteenth control signal terminal, a first electrode of the fifteenth transistor is electrically connected to the one operational amplifier, and a second electrode of the fifteenth transistor is electrically connected to one of the two data lines;

a gate of the sixteenth transistor is electrically connected to a sixteenth control signal terminal, a first electrode of the sixteenth transistor is electrically connected to the one operational amplifier, and a second electrode of the sixteenth transistor is electrically connected to the other one of the two data lines.

In some embodiments, the display substrate provided by the present disclosure, further including a source driver chip in the frame area, the source driver chip includes the plurality of gate circuits, the plurality of reusing circuits, and the plurality of operational amplifiers.

In some embodiments, in the display substrate provided by the present disclosure, each single row in each of the pixel islands is arranged with k sub-pixels, and k is a multiple of 4;

each of the reusing circuits includes a third sub-reusing circuit, and sub-pixels electrically connected to the third sub-reusing circuit are sub-pixels in a $h^{th}$ and a $(h+k/4)^{th}$ columns of a same column of pixel island, wherein h is an integer greater than or equal to 1 and less than or equal to k/4, and an integer greater than or equal to (1+k/4) and less than or equal to (k−4).

In some embodiments, in the display substrate provided by the present disclosure, each adjacent i column of the pixel islands in the row direction forms a partition, and there are 2n partitions in the row direction, i is an integer greater than or equal to 2, n is a positive integer;

each of the reusing circuits further includes a fourth sub-reusing circuit, the fourth sub-reusing circuit connects sub-pixels which are in a same column of a same column of pixel island in the $m^{th}$ partition Z and sub-pixels which are in the same column of the same column of pixel island in the $(m+n)^{th}$ partition Z, wherein m is an integer greater than or equal to 1 and less than or equal to n.

In some embodiments, in the display substrate provided by the present disclosure, each of the third sub-reusing circuits connecting the $h^{th}$ column of sub-pixels and $(h+k/4)^{th}$ column of sub-pixels in the $j^{th}$ column of pixel island in the $m^{th}$ partition, includes a seventeenth transistor, an eighteenth transistor, a nineteenth transistor, a twentieth transistor and a twenty-first transistor, j is an integer greater than or equal to 1 and less than or equal to i;

each of the third sub-reusing circuits connecting the $h^{th}$ column of sub-pixels and $(h+k/4)^{th}$ column of sub-pixels in the $j^{th}$ column of pixel island in the $(m+n)^{th}$ partition, includes a twenty-second transistor, a twenty-third transistor, a twenty-fourth transistor, a twenty-fifth transistor and a twenty-sixth transistor;

each of the fourth sub-reusing circuits connecting the $h^{th}$ column of sub-pixels in the $j^{th}$ column of pixel island in the $m^{th}$ partition and the $h^{th}$ column of sub-pixels in the $j^{th}$ column of pixel island in the $(m+n)^{th}$ partition, includes a twenty-seventh transistor;

each of the fourth sub-reusing circuits connecting the $(h+k/4)^{th}$ column of sub-pixels in the $j^{th}$ column of pixel island in the $m^{th}$ partition and the $(h+k/4)^{th}$ column of sub-pixels in the $j^{th}$ column of pixel island in the $(m+n)^{th}$ partition, includes a twenty-eighth transistor;

wherein a gate electrode of the seventeenth transistor is electrically connected to a seventeenth control signal terminal, a first electrode of the seventeenth transistor is electrically connected to a second electrode of the eighteenth transistor, and the second electrode of the seventeenth transistor is electrically connected to a data line corresponding to the $h^{th}$ column of sub-pixels in the $j^{th}$ column of pixel island in the $m^{th}$ partition;

a gate electrode of the eighteenth transistor is electrically connected to an eighteenth control signal terminal, and a first electrode of the eighteenth transistor is electrically connected to an operational amplifier corresponding to the $h^{th}$ column of sub-pixels in the $j^{th}$ column of pixel island in the $m^{th}$ partition;

a gate of the nineteenth transistor is electrically connected to a nineteenth control signal terminal, a first electrode of the nineteenth transistor is electrically connected to a second electrode of the twentieth transistor, and a second electrode of the nineteenth transistor is electrically connected to a data line corresponding to the $(h+k/4)^{th}$ column of sub-pixels in the $j^{th}$ column of pixel island in the $m^{th}$ partition;

a gate electrode of the twentieth transistor is electrically connected to a twentieth control signal terminal, and a first electrode of the twentieth transistor is electrically connected to an operational amplifier corresponding to the $(h+k/4)^{th}$ column of sub-pixels in the $j^{th}$ column of pixel island in the $m^{th}$ partition;

a gate of the twenty-first transistor is electrically connected to a twenty-first control signal terminal, a first electrode of the twenty-first transistor is electrically connected to a second electrode of the twentieth transistor, and a second electrode of the twenty-first transistor is electrically connected to the second electrode of the eighteenth transistor;

a gate of the twenty-second transistor is electrically connected to a twenty-second control signal terminal, a first electrode of the twenty-second transistor is electrically connected to a second electrode of the twenty-third transistor, and a second electrode of the twenty-second transistor is electrically connected to a data line corresponding to the $h^{th}$ column of sub-pixels in the $j^{th}$ column of pixel island in the $(m+n)^{th}$ partition;

a gate electrode of the twenty-third transistor is electrically connected to a twenty-third control signal terminal, and a first electrode of the twenty-third transistor is electrically connected to an operational amplifier corresponding to the $h^{th}$ column of sub-pixels in the $j^{th}$ column of pixel island in the $(m+n)^{th}$ partition;

a gate of the twenty-fourth transistor is electrically connected to a twenty-fourth control signal terminal, a first electrode of the twenty-fourth transistor is electrically connected to a second electrode of the twenty-fifth transistor, and the second electrode of the twenty-fourth transistor is electrically connected to a data line corresponding to the $(h+k/4)^{th}$ column of sub-pixels in the $j^{th}$ column of pixel island in the $(m+n)^{th}$ partition;

a gate electrode of the twenty-fifth transistor is electrically connected to a twenty-fifth control signal terminal, and a first electrode of the twenty-fifth transistor is electrically connected to an operational amplifier corresponding to the $(h+k/4)^{th}$ column of sub-pixels in the $j^{th}$ column of pixel island in the $(m+n)^{th}$ partition;

a gate of the twenty-sixth transistor is electrically connected to a twenty-sixth control signal terminal, a first electrode of the twenty-sixth transistor is electrically connected to a second electrode of the twenty-fifth transistor, and a second electrode of the twenty-sixth transistor is electrically connected to the second electrode of the twenty-third transistor;

a gate electrode of the twenty-seventh transistor is electrically connected to a twenty-seventh control signal terminal, and a first electrode of the twenty-seventh transistor is electrically connected to an operational amplifier corresponding to the $h^{th}$ column of sub-pixels in the $j^{th}$ column of pixel island in the $(m+n)^{th}$ partition, and a second electrode of the twenty-seventh transistor is electrically connected to an operational amplifier corresponding to the $h^{th}$ column of sub-pixels in the $j^{th}$ column of pixel island in the $m^{th}$ partition;

a gate electrode of the twenty-eighth transistor is electrically connected to a twenty-eighth control signal terminal, and a first electrode of the twenty-eighth transistor is electrically connected to an operational amplifier corresponding to the $(h+k/4)^{th}$ column of sub-pixels in the $j^{th}$ column of pixel island in the $(m+n)^{th}$ partition, and a second electrode of the twenty-eighth transistor is electrically connected to an operational amplifier corresponding to the $(h+k/4)^{th}$ column of sub-pixels in the $j^{th}$ column of pixel island in the $m^{th}$ partition.

In another aspect, some embodiments of the present disclosure provide a method for driving the above display substrate, including:

in a reusing mode, controlling each reusing circuit to conduct one of the data lines that are electrically connected to the reusing circuit, and disconnecting the other data lines that are electrically connected to the reusing circuit, so that data signals output by at least two operational amplifiers are provided to sub-pixels in a same column that are electrically connected to the conducted one data line through the reusing circuit and the conducted one data line;

in a non-reusing mode, controlling each reusing circuit to disconnect all data lines electrically connected to the reusing circuit, so as to provide each data signal output by each operational amplifier to each column of sub-pixels electrically connected to each operational amplifier in a one-to-one correspondence.

In another aspect, some embodiments of the present disclosure provide a display device, including the above display substrate.

BRIEF DESCRIPTION OF FIGURES

FIG. 16 is a schematic structural diagram of the third sub-reusing circuit and the fourth reusing circuit in FIG. 14;

FIG. 17 is a flow chart of a driving method for a display substrate provided by an embodiment of the present disclosure.

DETAILED DESCRIPTION

Figure 1:
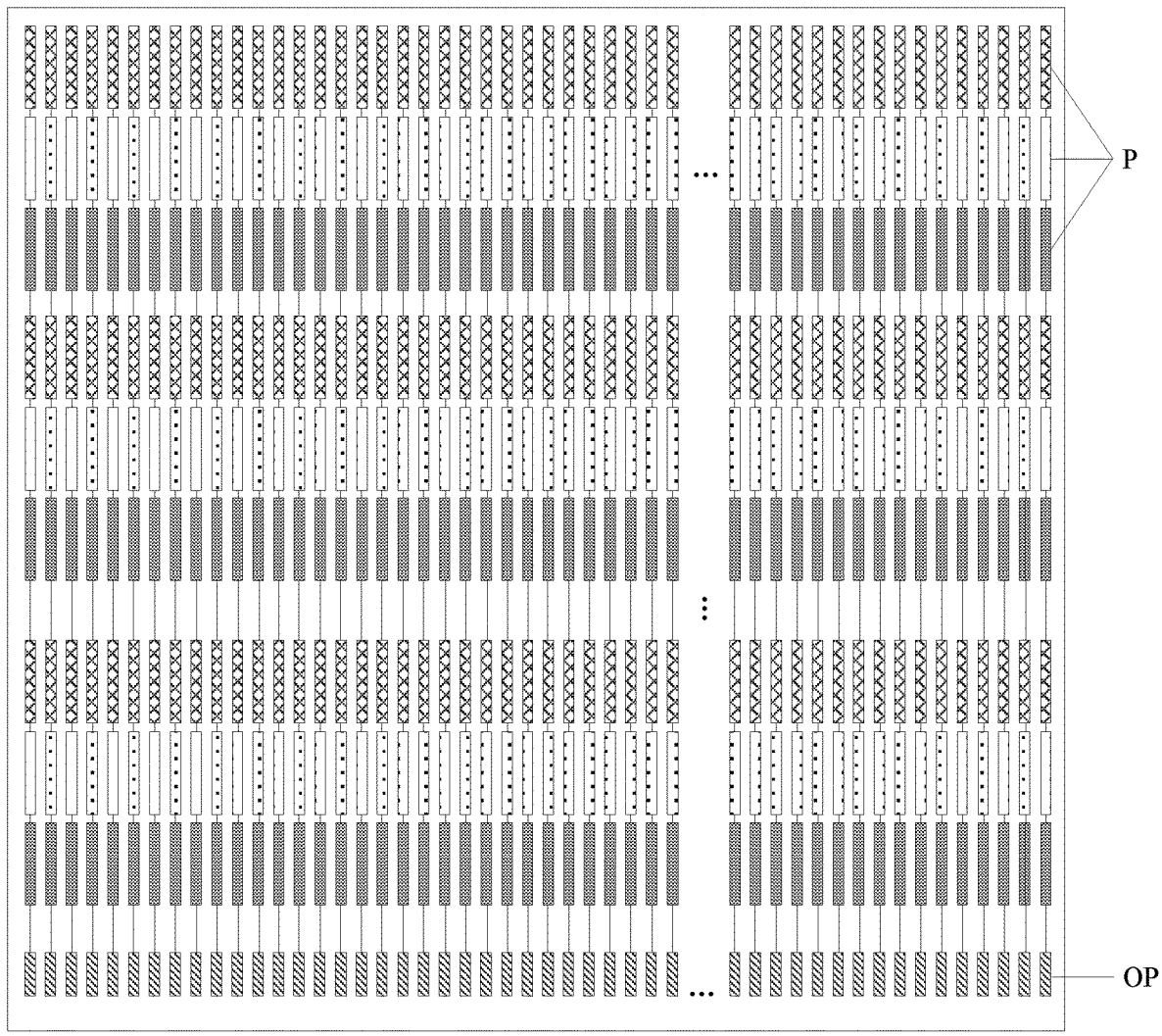
FIG. 1 is a schematic structural diagram of a display substrate in the related art.

In order to make the purpose, technical solutions and advantages of the embodiments of the present disclosure more clear, the technical solutions of the embodiments of the present disclosure will be clearly and completely described below in conjunction with the drawings of the embodiments of the present disclosure. It should be noted that the sizes and shapes of the figures in the drawings do not reflect true proportions and are only intended to illustrate the present disclosure, and the same or similar reference numbers throughout represent the same or similar elements or elements with the same or similar functions.

Unless otherwise defined, technical or scientific terms used herein shall have their ordinary meaning understood by a person of ordinary skill in the art to which this disclosure belongs. "First", "second" and similar words used in this disclosure and the claims do not indicate any order, quantity or importance, but are only used to distinguish different components. Words such as "include" or "comprising" mean that the elements or things appearing before the word include the elements or things listed after the word and their equivalents, without excluding other elements or things. "Inside", "outside", "up", "down", etc. are only used to express relative positional relationships. When the absolute position of the described object changes, the relative positional relationship may also change accordingly.

FIG. 1 shows the structure of a display substrate in the related art, in which each operational amplifier OP is electrically connected to a column of sub-pixels P, and the number of operational amplifiers OP is consistent with the number of sub-pixels P in a row. The operational amplifier OP is used to amplify the data signal output by the source driver chip (Source IC) and then provide it to the corresponding connected sub-pixel P. However, in 3D display, the refresh rate of the human eye's watching area is greater than the refresh rate of the non-watching area, or not all sub-pixels P are lit, resulting in that operational amplifiers OP corresponding to the non-watching area or the unlit sub-pixel P are idle, causing a waste of resources.

Figure 2:
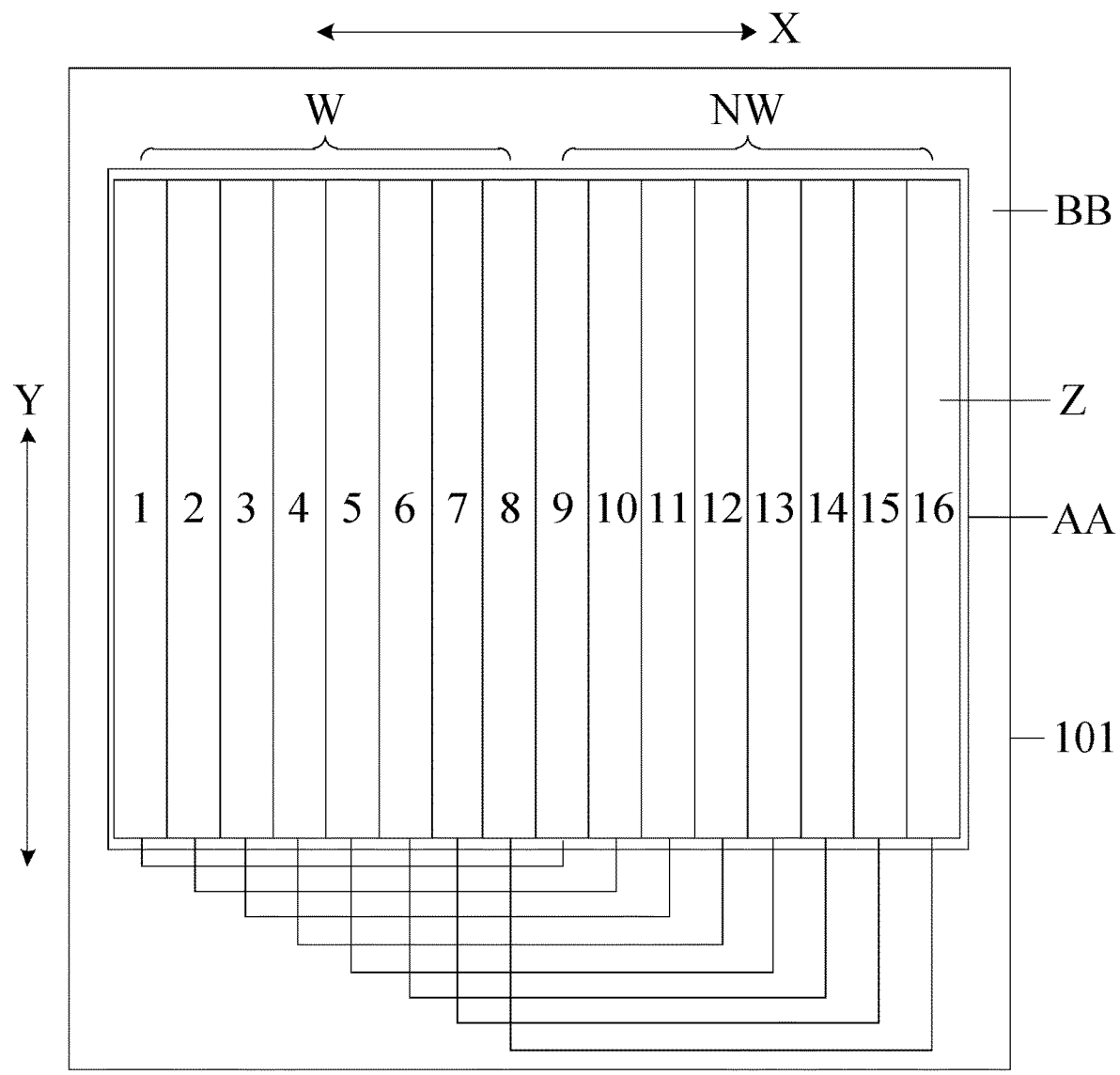
FIG. 2 is a schematic structural diagram of a display substrate provided by an embodiment of the present disclosure.
Figure 3:
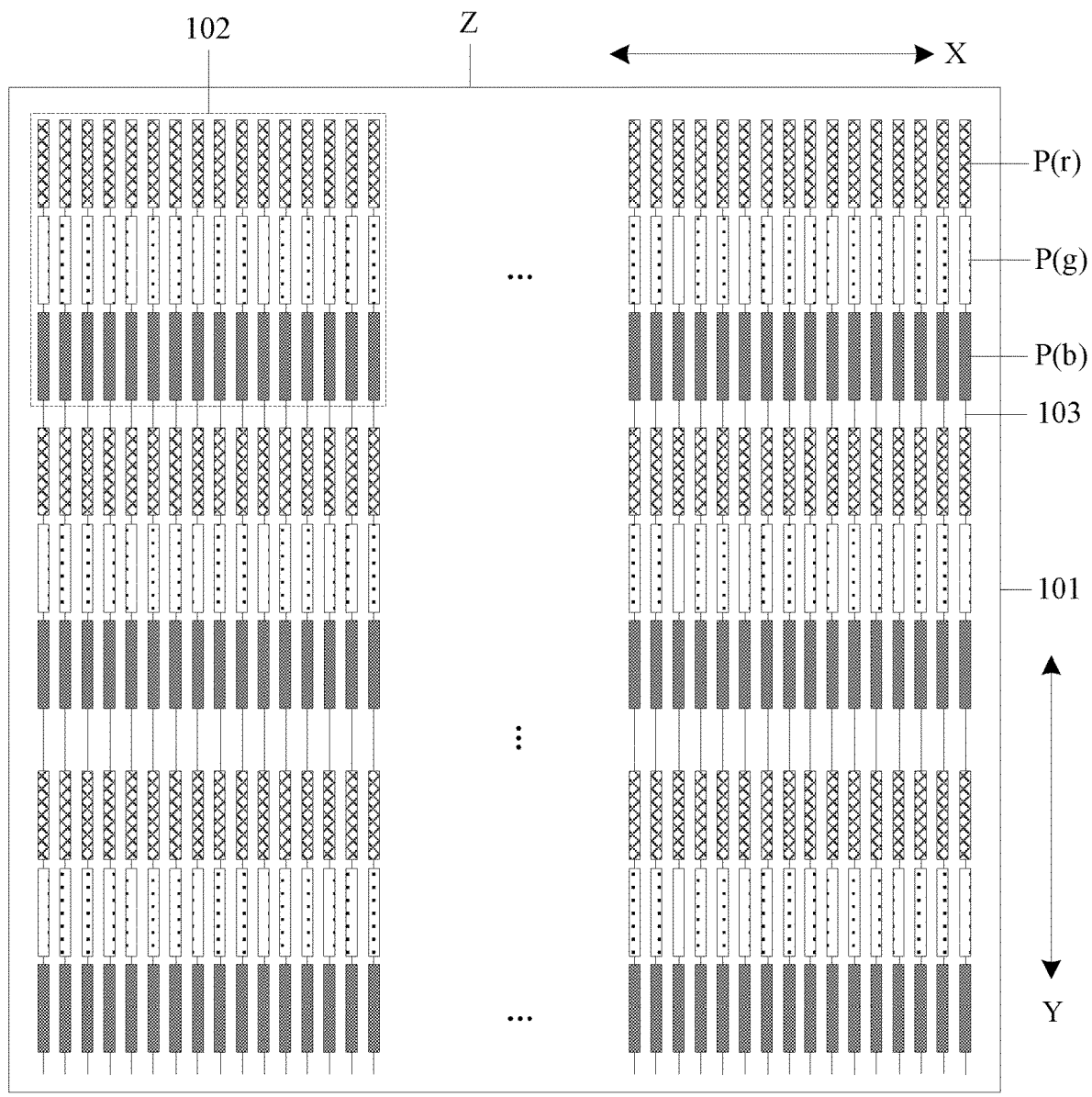
FIG. 3 is a schematic structural diagram of a partition.
Figure 4:
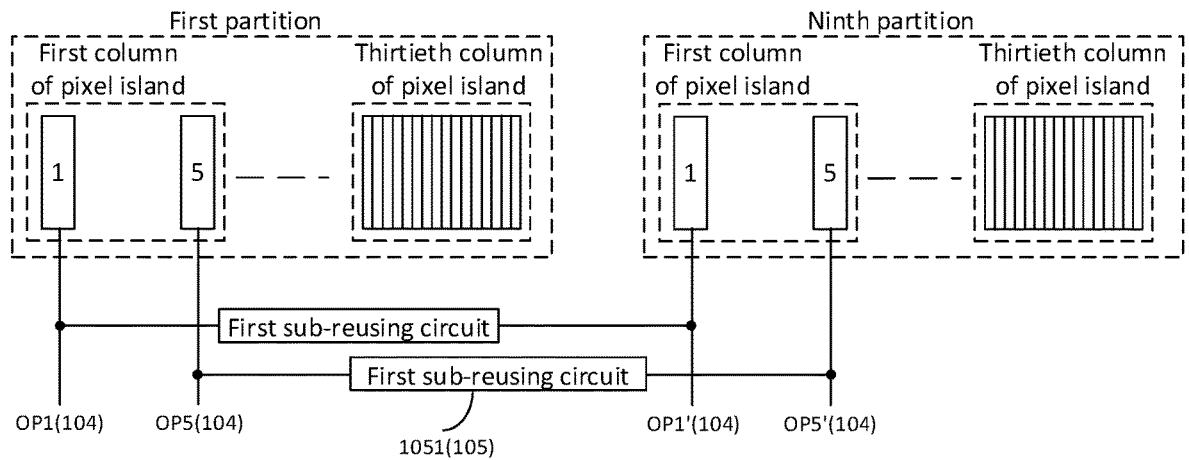
FIG. 4 is a schematic diagram of a reusing of operational amplifiers corresponding to different partitions.

In order to solve the above technical problems existing in the related art, embodiments of the present disclosure provide a display substrate, as shown in FIGS. 2 to 4, including:

- a base substrate 101 including a display area AA and a frame area BB located on at least one side of the display area AA;
- a plurality of pixel islands 102 being arranged in an array in the display area AA; each pixel island 102 having a plurality of sub-pixels P arranged in an array;
- a plurality of data lines 103 extending along the column direction Y and being arranged along the row direction X in the display area AA; the data lines 103 being electrically connected to the sub-pixels P;
- a plurality of operational amplifiers (OP) 104 being in the frame area BB; each operational amplifier 104 being electrically connected to a column of sub-pixels P through the data line 103;
- a plurality of reusing circuits 105 being in the frame area BB; each reusing circuit 105 being connected to at least two operational amplifiers 104, and the sub-pixels P electrically connected to each reusing circuit 105 through the data lines 103 being located in at least two columns.

In the above display substrate provided by embodiments of the present disclosure, the reusing circuit 105 is controlled to conduct one of the data lines 103 connected to it and disconnect the remaining data lines 103 connected to it, so that through the conductive reusing circuit 105 and data line 103, the reusing circuit 105 can provide data signals output by at least two operational amplifiers OP to sub-pixels P in the same column that are electrically connected to the data line 103. In this way, by dynamically gating the idle operational amplifier OP in the related art through the reusing circuit 105, the resource utilization rate of the operational amplifier 104 is improved.

In addition, in the present disclosure, the reusing circuit 105 can also be controlled to disconnect from all the data lines 103 connected to it, so as to provide the data signal output by each operational amplifier 104 to each column of sub-pixels P electrically connected to the each operational amplifier 104 in a one-to-one correspondence. In such a case, the respective operational amplifiers 104 work independently and are not reused with each other.

In some embodiments, all sub-pixels P of each pixel island 102 are located in three rows and at least two columns, and in each pixel island 102, the display colors of the sub-pixels P in the same row are the same, and the display colors of the sub-pixels P in different rows are different. For example, in FIG. 3, each pixel island 102 may include red sub-pixels r, green sub-pixels g, and blue sub-pixels b. Here, the number of red sub-pixels r, green sub-pixels g and blue sub-pixels b is the same. The red sub-pixels r are arranged in a row along the row direction X, the green sub-pixels g are arranged in a row along the row direction X, and the blue sub-pixels b are arranged in a row along the row direction X. The rows of red sub-pixels, green sub-pixels and blue sub-pixels are arranged along the column direction Y so that the pixel islands and the sub-pixels P in each pixel island are arranged in an array.

In some embodiments, in the above display substrate provided by embodiments of the present disclosure, as shown in FIGS. 2 to 4, at least every two adjacent columns of pixel islands 102 in the row direction X constitute a partition Z. The reusing circuit 105 includes first sub-reusing circuits 1051. The sub-pixels P electrically connected to each first sub-reusing circuit 1051 are located in at least two partitions Z, so as to reuse the operational amplifiers 104 corresponding to sub-pixels P in different partitions Z through the first sub-reusing circuit 1051.

In order to better understand the technical solution of the present disclosure, each first sub-reusing circuit 1051 being connected among two operational amplifiers 104 and the data lines 103 electrically connected to the two operational amplifiers 104, and the sub-pixels P electrically connected to the first sub-reusing circuit 1051 being located in two partitions Z, are taken as an example for description.

In some embodiments, in the above display substrate provided by embodiments of the present disclosure, as shown in FIGS. 2 to 4, there are 2n (for example, 16) partitions Z in the row direction X, where n is a positive integer.

The $1^{st}$ to $n^{th}$ partitions arranged continuously are the watching area W, and the $(n+1)^{th}$ to $2n^{th}$ partitions arranged continuously are the non-watching area NW. Because the watching area W is a continuous range, it can support ½ continuous area of the display substrate.

The sub-pixels P electrically connected to each first sub-reusing circuit 1051 are located in the $m^{th}$ and $(m+n)^{th}$ partitions Z, where m is an integer greater than or equal to 1 and less than or equal to n.

The $m^{th}$ partition Z is located in the watching area W and the $(m+n)^{th}$ partition Z is located in the non-watching area NW. Therefore, when the non-watching area NW is not refreshed and the watching area W is refreshed, the operational amplifier 104 corresponding to the $(m+n)^{th}$ partition Z in the non-attention area NW to the $m^{th}$ partition Z can be reused in the watching area W through the first sub-reusing circuit 1051, so that the operational amplifier 104 corresponding to the $(m+n)^{th}$ partition Z and the operational amplifier 104 corresponding to the $m^{th}$ partition Z simultaneously provide data signals for the sub-pixels P in the $m^{th}$ partition Z, thereby reducing the charging time and improving the charging rate of the watching area W. In addition, when both the watching area W and the non-watching area NW are refreshed, the operational amplifiers 104 can be used separately in the watching area W and the non-watching area NW, that is, the operational amplifiers are not reused across areas.

In some embodiments, in the above display substrate provided by embodiments of the present disclosure, as shown in FIGS. 2 to 4, each partition Z includes i columns of pixel islands 102, where i is an integer greater than or equal to 2. The first sub-pixels P electrically connected to the first sub-reusing circuit 1051 are located in the $j^{th}$ column of pixel islands 102 of the $m^{th}$ partition and the $j^{th}$ column of pixel islands 102 of the $(m+n)^{th}$ partition, where j is an integer greater than or equal to 1 and less than or equal to i. This arrangement not only enables the mutual reusing of the operational amplifier 104 corresponding to the $j^{th}$ column of pixel islands 102 of the $m^{th}$ partition and the operational amplifier 104 corresponding to the $j^{th}$ column of pixel islands 102 of the $(m+n)^{th}$ partition, and can also simplify the wiring method.

In some embodiments, in the above display substrate provided by embodiments of the present disclosure, as shown in FIGS. 2 to 4, each pixel island 102 is arranged in a single row with k sub-pixels P, where k is an even number. Sub-pixels P electrically connected to a first sub-reusing circuit 1051 are at least part of the sub-pixels P in the $h^{th}$ column of the $j^{th}$ column of pixel islands in the $m^{th}$ partition Z, and at least part of the sub-pixels P in the $h^{th}$ column of the $j^{th}$ column of pixel islands in the $(m+n)^{th}$ partition Z. Here, h is an integer greater than or equal to 1 and less than or equal to k/4, and an integer greater than or equal to (1+k/4) and less than or equal to (k−4). This arrangement can not only reuse the operational amplifier 104 corresponding to the $h^{th}$ column of sub-pixels P of the $j^{th}$ column of pixel islands 102 in the $m^{th}$ partition Z, and the operation amplifier 104 corresponding to the $h^{th}$ column of sub-pixels P of the $j^{th}$ column of pixel islands 102 in the $(m+n)^{th}$ partition Z, but also simplify the wiring method.

In some embodiments, in the above display substrate provided by embodiments of the present disclosure, as shown in FIGS. 2 to 4, a data line 103 is connected between an operational amplifier 104 and a column of sub-pixels P. In such a case, the sub-pixels P electrically connected to each first sub-reusing circuit 1051 are the $h^{th}$ column of sub-pixels P of the $j^{th}$ column of pixel islands in the $m^{th}$ partition, and the $h^{th}$ column of sub-pixels P of the $j^{th}$ column of pixel islands in the $(m+n)^{th}$ partition.

Figure 5:
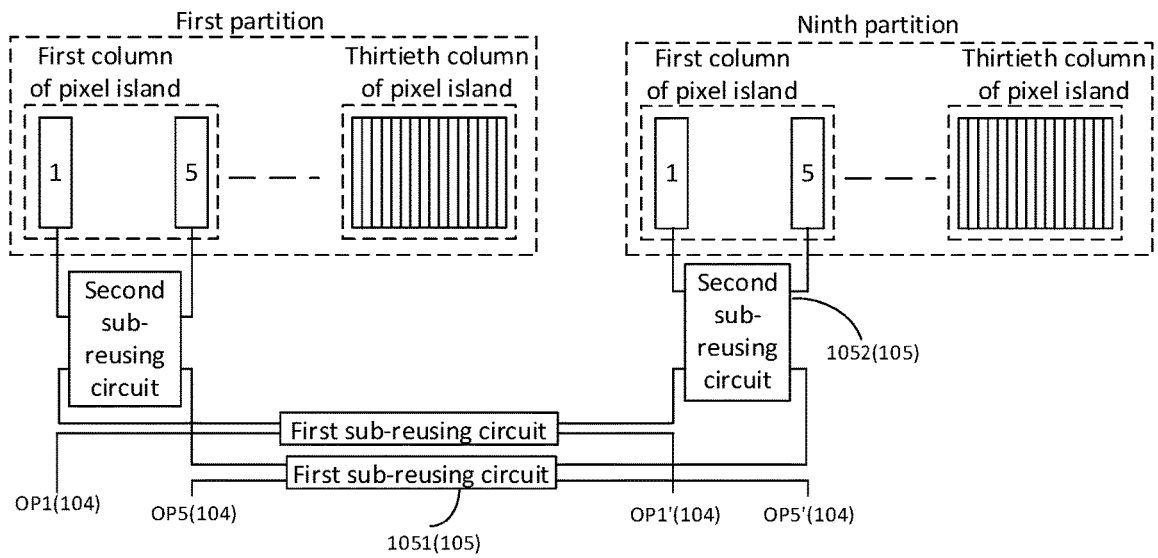
FIG. 5 shows the reusing of operational amplifiers corresponding to different partitions together with a reusing of operational amplifiers corresponding to different sub-pixels in the same pixel island.

In some embodiments, in the above display substrate provided by embodiments of the present disclosure, as shown in FIG. 5, the reusing circuit 105 may also include a second sub-reusing circuit 1052. Each second sub-reusing circuit 1052 is connected between two columns of sub-pixels P in the same pixel island 102 and between two first sub-reusing circuits 1051 corresponding to the two columns of sub-pixels P.

The second sub-reusing circuit 1052 can be used to reuse the operational amplifiers 104 respectively corresponding to the two columns of sub-pixels P in the same pixel island 102. when the reusing circuit 105 has both a first sub-reusing circuit 1051 and a second sub-reusing circuit 1052, the first sub-reusing circuit 1051 can realize reusing of the operational amplifiers 104 corresponding to different partitions Z, and it is also compatible with the reusing of operational amplifiers 104 corresponding to two columns of sub-pixels P in the same column of pixel islands 102 in the same partition Z.

Figure 6:
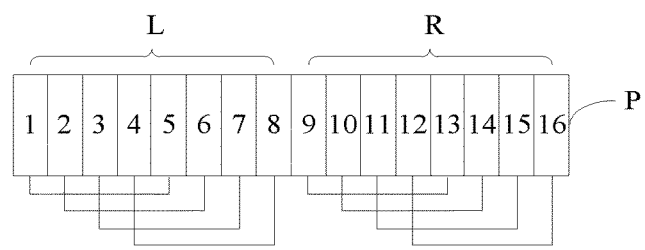
FIG. 6 is a schematic diagram of the reusing of operational amplifiers corresponding to different sub-pixels in the same pixel island.

In some embodiments, in the above display substrate provided by embodiments of the present disclosure, as shown in FIGS. 5 and 6, k is a multiple of 4, and h is an integer greater than or equal to 1 and less than or equal to k/4, and an integer greater than or equal to (1+k/4) and less than or equal to (k−4). The emitted light rays from the $1^{st}$ to $(k/2)^{th}$ sub-pixels P can be converged to the left eye L to form the left eye view point (View), and the emitted light rays from the $(1+k/2)^{th}$ to the kth sub-pixels P can be converged to the right eye R to form a right eye view point (View), to achieve naked-eye 3D display. Optionally, each second sub-reusing circuit 1052 is electrically connected to the $h^{th}$ column and the $(h+k/4)^{th}$ column of sub-pixels P of the same column of pixel islands 102 respectively, so that the operational amplifier 104 corresponding to the $h^{th}$ column of sub-pixels P and the operational amplifier 104 corresponding to the $(h+k/4)^{th}$ column of sub-pixels P in the same column of pixel islands 102 can be reused with each other, which is beneficial to simplifying the wiring design.

Figure 7:
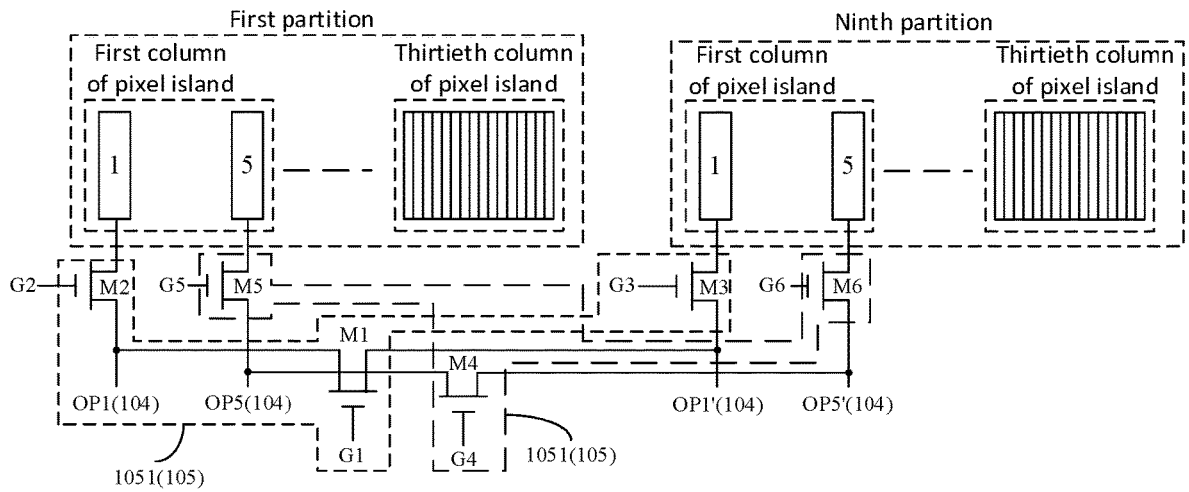
FIG. 7 is a schematic structural diagram of the first sub-reusing circuit in FIG. 4.
Figure 8:
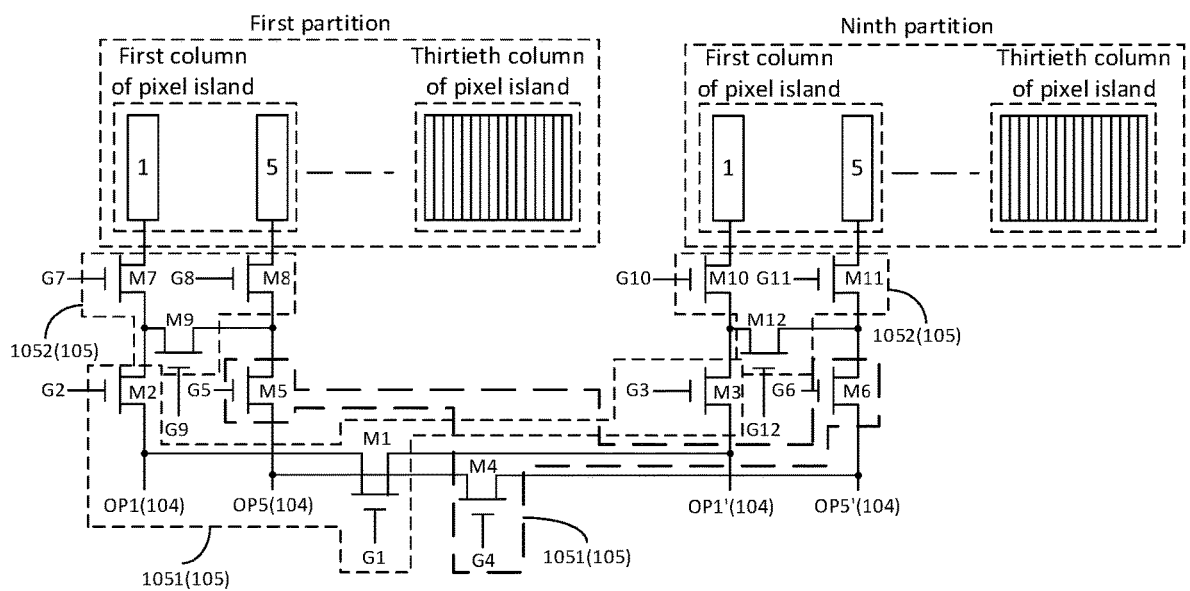
FIG. 8 is a schematic structural diagram of the first sub-reusing circuit and the second reusing circuit in FIG. 5.

In some embodiments, in the above display substrate provided by embodiments of the present disclosure, as shown in FIGS. 7 and 8, the first sub-reusing circuit 1051 connecting the $h^{th}$ column of sub-pixels P of the $j^{th}$ column of pixel islands 102 in the $m^{th}$ partition Z to the $h^{th}$ column of sub-pixels P of the $j^{th}$ column of pixel islands 102 in the $(m+n)^{th}$ partition Z, includes a first transistor M1, a second transistor M2 and a third transistor M3.

The first sub-reusing circuit 1051 connecting the $(h+k/4)^{th}$ column of sub-pixels P of the $j^{th}$ column of pixel islands 102 in the $m^{th}$ partition Z to the $(h+k/4)^{th}$ column of sub-pixels P of the $j^{th}$ column of pixel islands 102 in the $(m+n)^{th}$ partition Z, includes a fourth transistor M4, a fifth transistor M5 and a sixth transistor M6.

The second sub-reusing circuit 1052 connecting the $h^{th}$ column and the $(h+k/4)^{th}$ column of sub-pixels P of the $j^{th}$ column of pixel islands 102 in the $m^{th}$ partition Z, includes a seventh transistor M7, an eighth transistor M8 and Ninth transistor M9.

The second sub-reusing circuit 1052 connecting the $h^{th}$ column and the $(h+k/4)^{th}$ column of sub-pixels P of the $j^{th}$ column of pixel islands 102 in the $(m+n)^{th}$ partition Z, includes a tenth transistor M10, an eleventh transistor M11 and a twelfth transistor M12.

The gate electrode of the first transistor M1 is electrically connected to the first control signal terminal G1. The first electrode of the first transistor M1 is electrically connected to the operational amplifier 104 corresponding to the $h^{th}$ column of sub-pixels P of the $j^{th}$ column of pixel islands 102 in the $(m+n)^{th}$ partition Z. The second electrode of the first transistor M1 is electrically connected to the operational amplifier 104 corresponding to the $h^{th}$ column of sub-pixels P of the $j^{th}$ column of pixel islands 102 in the $m^{th}$ partition Z.

The gate of the second transistor M2 is electrically connected to the second control signal terminal G2. The first electrode of the second transistor M2 is electrically connected to the second electrode of the first transistor M1. The second electrode of the second transistor M2 is electrically connected to the first electrode of the seventh transistor M7.

The gate of the third transistor M3 is electrically connected to the third control signal terminal G3. The first electrode of the third transistor M3 is electrically connected to the first electrode of the first transistor M1. The second electrode of the third transistor M3 is electrically connected to the first electrode of the tenth transistor M10.

The gate electrode of the fourth transistor M4 is electrically connected to the fourth control signal terminal G4. The first electrode of the fourth transistor M4 is connected to the operational amplifier 104 corresponding to the $(h+k/4)^{th}$ column of sub-pixels P of the $j^{th}$ column of pixel islands 102 in the $(m+n)^{th}$ partition Z. The second electrode of the fourth transistor M4 is electrically connected to the operational amplifier 104 corresponding to the $(h+k/4)^{th}$ column of sub-pixels P of the $j^{th}$ column of pixel islands 102 in the $m^{th}$ partition Z.

The gate of the fifth transistor M5 is electrically connected to the fifth control signal terminal G5. The first electrode of the fifth transistor M5 is electrically connected to the second electrode of the fourth transistor M4. The second electrode of the fifth transistor M5 is electrically connected to the first electrode of the eighth transistor M8.

The gate of the sixth transistor M6 is electrically connected to the sixth control signal terminal G6. The second electrode of the sixth transistor M6 is electrically connected to the first electrode of the eleventh transistor M11. The first electrode of the sixth transistor M6 is electrically connected to the first electrode of the fourth transistor M4.

The gate electrode of the seventh transistor M7 is electrically connected to the seventh control signal terminal G7. The second electrode of the seventh transistor M7 is electrically connected to the data line 103 corresponding to the $h^{th}$ column of sub-pixels P of the $j^{th}$ column of pixel islands 102 in the $m^{th}$ partition Z.

The gate electrode of the eighth transistor M8 is electrically connected to the eighth control signal terminal G8. The second electrode of the eighth transistor M8 is connected to the data line 103 corresponding to the $(h+k/4)^{th}$ column of sub-pixels P of the $j^{th}$ column of pixel islands 102 in the $m^{th}$ partition Z.

The gate of the ninth transistor M9 is electrically connected to the ninth control signal terminal G9. The first electrode of the ninth transistor M9 is electrically connected to the second electrode of the fifth transistor M5. The second electrode of the ninth transistor M9 is electrically connected to the second electrode of the second transistor M2.

The gate electrode of the tenth transistor M10 is electrically connected to the tenth control signal terminal G10, The second electrode of the tenth transistor M10 is electrically connected to the data line 103 corresponding to the $h^{th}$ column of sub-pixels P of the $j^{th}$ column of pixel islands 102 in the $(m+n)^{th}$ partition Z.

The gate electrode of the eleventh transistor M11 is electrically connected to the eleventh control signal terminal G11. The second electrode of the eleventh transistor M11 is connected to the data line 103 corresponding to the $(h+k/4)^{th}$ column of sub-pixels P of the $j^{th}$ column of pixel islands 102 in the $(m+n)^{th}$ partition Z.

The gate of the twelfth transistor M12 is electrically connected to the twelfth control signal terminal G12. The first electrode of the twelfth transistor M12 is electrically connected to the second electrode of the sixth transistor M6. The second electrode of the twelfth transistor M12 is electrically connected to the second electrode of the third transistor M3.

Taking the display substrate provided by the present disclosure as having a total of 16 partitions Z, each partition Z having 30 columns of pixel islands 102, and each pixel island 102 having 16 sub-pixels P as an example, the total number of transistors included in all the first sub-reusing circuits 1051 in the display substrate shown in FIGS. 4 and 7 is "3 (the number of transistors included in each first sub-reusing circuit 1051)×8 (8 groups of partitions)×30 (30 pixel islands in each partition)×16 (16 sub-pixels in each pixel island)=11520". If the display status of the sub-pixels P in respective partitions Z is the same, it is necessary to have "3 (the number of transistors included in each first sub-reusing circuit 1051)×8 (8 groups of partitions)×16 (16 sub-pixels in each pixel island)=384" control signal terminals to determine the switching state of the transistors. The total number of transistors included in all the first sub-reusing circuits 1051 and the second sub-reusing circuits 1052 in the display substrate shown in FIGS. 5 and 8 is "12 (the number of transistors included in two first sub-reusing circuits 1051 and two second sub-reusing circuits 1051)×8 (8 groups in each pixel island)×30 (30 pixel islands in each partition)×8 (8 groups of partitions)=23040". If the display status of the sub-pixels P in the respective partitions Z is the same, it is necessary to have "12 (the number of transistors included in two first sub-reusing circuits 1051 and two second sub-reusing circuits 1052)×8 (8 groups in each pixel island)×8 (8 groups partition)=768" control signal terminals to determine the switching state of the transistors.

For example, FIG. 7 and FIG. 8 show that the first column of sub-pixels P of the first column of pixel island 102 in the first partition Z, and the first column of sub-pixels P of the first column of pixel island 102 in the ninth partition Z are electrically connected to the same first sub-reusing circuit 1051. The fifth column of sub-pixels P of the first column of the pixel island 102 in the first partition Z, and the fifth column of sub-pixels P of the first column of the pixel island 102 in the ninth partition Z are electrically connected to another first sub-reusing circuit 1051. In addition, FIG. 8 also shows that the first column and the fifth column of sub-pixels P of the first column of pixel island 102 in the first partition Z are electrically connected with the same second sub-reusing circuit 1052, and the first column and the fifth column of sub-pixels P of the first column of pixel island 102 in the ninth partition Z are electrically connected to another second sub-reusing circuit 1052.

In some embodiments, '1' represents a high-level signal and '0' represents a low-level signal. Each transistor is turned on under a high-level signal and turned off under a low-level signal. It should be noted that '1' and '0' are logic levels, which are only used to better explain the working process of the embodiments of the present disclosure, rather than are the voltages applied to the gate of each transistor during implementations.

Table 1 exemplarily shows, when transistors in FIG. 7 are applied with different logic levels, the working state of the operational amplifier 104 (i.e., OP1 in Table 1) corresponding to the first column of sub-pixels P in the first column of pixel island 102 in the first partition Z and the working state of the operational amplifier 104 (that is, OP1' in Table 1) corresponding to the first column of sub-pixels P in the first column of the pixel island 102 in the ninth partition Z, the working state of the operation amplifier 104 (i.e., OP5 in Table 1) corresponding to the fifth column of sub-pixels P in the first column of pixel island 102 in the first partition Z, and the working state of the operational amplifier 104 (i.e., OP5' in Table 1) corresponding to the fifth column of sub-pixels P in the first column of pixel island 102 in the ninth partition Z.

It can be seen from Table 1 and FIG. 7 that when the first transistor M1 and the third transistor M3 are turned on and the second transistor M2, the fourth transistor M4, the fifth transistor M5 and the sixth transistor M6 are turned off, the operational amplifier 104 (i.e., OP1 in Table 1) corresponding to the first column of sub-pixels P in the first column of the pixel island 102 in the first partition Z can be reused as the operational amplifier 104 (i.e., OP1' in Table 1) corresponding to the first column of sub-pixels P in the first column of the pixel island 102 in the ninth partition Z. When the first transistor M1 and the second transistor M2 are turned on, and the third transistor M3, the fourth transistor M4, the fifth transistor M5, and the sixth transistor M6 are turned off, the operational amplifier 104 (i.e. OP1' in Table 1) corresponding to the first column of sub-pixels P in the first column of the pixel island 102 in the ninth partition Z can be reused as the operational amplifier 104 (i.e., OP1 in Table 1) corresponding to the first column of sub-pixels P in the first column of the pixel island 102 in the first partition Z.

When the fourth transistor M4 and the sixth transistor M6 are turned on and the first transistor M1, the second transistor M2, the third transistor M3 and the fifth transistor M5 are turned off, the operational amplifier 104 (i.e., OP5 in Table 1) corresponding to the fifth column of sub-pixels P in the first column of pixel island 102 in the first partition Z can be reused as the operational amplifier 104 (i.e., OP5' in Table 1) corresponding to the fifth column of sub-pixels P in the first column of the pixel island 102 in the ninth partition Z. When the fourth transistor M4 and the fifth transistor M5 are turned on, and the first transistor M1, the second transistor M2, the third transistor M3 and the sixth transistor M6 are turned off, the operational amplifier 104 (i.e., OP5' in Table 1) corresponding to the fifth column of sub-pixels P in the first column of pixel island 102 in the ninth partition Z can be reused as the operational amplifier 104 (i.e., OP5 in Table 1) corresponding to the fifth column of sub-pixels P in the first column of pixel island 102 in the first partition Z.

When the first transistor M1, the third transistor M3, the fourth transistor M4 and the sixth transistor M6 are turned on, and the second transistor M2 and the fifth transistor M5 are turned off, the operational amplifier 104 (i.e., OP1 in Table 1) corresponding to the first column of sub-pixels P in the first column of pixel island 102 in the first partition Z can be reused as the operational amplifier 104 (i.e., OP1' in Table 1) corresponding to the first column of sub-pixels P in the first column of the pixel island 102 in the ninth partition Z, and the operational amplifier 104 (that is, OP5 in Table 1) corresponding to the fifth column of sub-pixels P in the first column of pixel island 102 in the first partition Z can be reused as the operational amplifier 104 (i.e., OP5' in Table 1) corresponding to the fifth column of sub-pixels P in the first column of pixel island 102 in the ninth partition Z. When the first transistor M1, the second transistor M2, the fourth transistor M4, and the fifth transistor M5 are turned on, and the third transistor M3 and the sixth transistor M6 are turned off, the operational amplifier 104 (i.e., OP1' in Table 1) corresponding to the first column of sub-pixels P in the first column of the pixel island 102 in the ninth partition Z can be reused as the operational amplifier 104 (that is, OP1 in Table 1) corresponding to the first column of sub-pixels P in the first column of the pixel island 102 in the first partition Z, and the operational amplifier 104 (i.e., OP5' in Table 1) corresponding to the fifth column of sub-pixels P in the first column of pixel island 102 in the ninth partition Z can be reused as the operational amplifier 104 (i.e., OP5 in Table 1) corresponding to the fifth column of sub-pixels P in the first column of pixel island 102 in the first partition Z.

When the second transistor M2, the third transistor M3, the fifth transistor M5, and the sixth transistor M6 are turned on, and the first transistor M1 and the fourth transistor M4 are turned off, the operational amplifier 104 (i.e., OP1' in Table 1) corresponding to the first column of sub-pixels P in the first column of the pixel island 102 in the ninth partition Z and the operational amplifier 104 (i.e., OP1' in Table 1) corresponding to the first column of sub-pixels P in the first column of pixel island 102 in the first partition Z are not reused, and the operational amplifier 104 (i.e., OP5' in Table 1) corresponding to the fifth column of sub-pixels P in the first column of pixel island 102 in the ninth partition Z and the operational amplifiers 104 (i.e., OP5 in Table 1) corresponding to the first column of sub-pixels P in the first column of pixel island 102 in the first partition Z are not reused.

Table 2-1 and Table 2-2 exemplarily show, when transistors in FIG. 8 are applied with different logic levels, the working state of the operational amplifier 104 (i.e., OP1) corresponding to the first column of sub-pixels P in the first column of pixel island 102 in the first partition Z, the working state of the operational amplifier 104 (i.e., OP1') corresponding to the first column of sub-pixels P in the first column of pixel island 102 in the ninth partition Z, the working state of the operational amplifier 104 (i.e., OP5) corresponding to the fifth column of sub-pixels P in the first column of pixel island 102 in the first partition Z, the working state of the operational amplifier 104 (i.e., OP5') corresponding to the fifth column of sub-pixels P in the first column of pixel island 102 in the ninth partition Z, the working states of the operational amplifiers 104 (i.e., OP1 and OP5) corresponding to the first and fifth columns of sub-pixels P in the first column of pixel island 102 in the first partition Z, and the working states of the operational amplifiers 104 (i.e., OP1' and OP5') corresponding to the first and fifth columns of sub-pixels P in the first column of pixel island 102 in the ninth partition Z.

As can be seen from Table 2-1 and FIG. 8, among the first to twelfth transistors M1 to M12, when the second transistor M2, the fifth transistor M5, the seventh transistor M7 and the ninth transistor M9 are turned on, and the remaining transistors are turned off, the operational amplifier 104 (i.e., OP5) corresponding to the fifth column of sub-pixels P in the first column of pixel island 102 in the first partition Z can be reused as the operational amplifier 104 (i.e., OP1) corresponding to the first column of sub-pixels P in the first column of pixel island 102 in the first partition Z. Among the first to twelfth transistors M1 to M12, when the second transistor M2, the fifth transistor M5, the eighth transistor M8, and the ninth transistor M9 are turned on, and the remaining transistors are turned off, the operational amplifier 104 (i.e., OP1) corresponding to the first column of sub-pixels P in the first column of pixel island 102 in the first partition Z can be reused as the operational amplifier 104 (i.e. OP5) corresponding to the fifth column of sub-pixels P in the first column of pixel island 102 in the partition Z. Among the first transistor M1 to the twelfth transistor M12, when the second transistor M2, the fifth transistor M5, the seventh transistor M7, and the eighth transistor M8 are turned on, and the remaining transistors are turned off, there is non-reuse between the operational amplifier 104 (i.e., OP1) corresponding to the first column of sub-pixels P in the first column of the pixel island 102 in the first partition Z and the operational amplifier 104 (i.e., OP5) corresponding to the fifth column of sub-pixels P in the first column of the pixel island 102 in the first partition Z.

Among the first to twelfth transistors M1 to M12, when the third transistor M3, the sixth transistor M6, the tenth

TABLE 1

| Transistor | ON/OFF State of Transistor | | | | | | |
|---|---|---|---|---|---|---|---|
| M1 | 1 | 1 | 0 | 0 | 1 | 1 | 0 |
| M2 | 0 | 1 | 0 | 0 | 0 | 1 | 1 |
| M3 | 1 | 0 | 0 | 0 | 1 | 0 | 1 |
| M4 | 0 | 0 | 1 | 1 | 1 | 1 | 0 |
| M5 | 0 | 0 | 0 | 1 | 0 | 1 | 1 |
| M6 | 0 | 0 | 1 | 0 | 1 | 0 | 1 |
| Working state | OP1 is reused as OP1' | OP1' is reused as OP1 | OP5 is reused as OP5' | OP5' is reused as OP5 | OP1 is reused as OP1'; OP5 is reused as OP5' | OP1' is reused as OP1; OP5' is reused as OP5 | Non-reuse | transistor M10 and the twelfth transistor M12 are turned on, and the remaining transistors are turned off, the operational amplifier 104 (i.e., OP5') corresponding to the fifth column of sub-pixels P in the first column of pixel island 102 in the ninth partition Z can be reused as the operational amplifier 104 (i.e., OP1') corresponding to the first column of sub-pixels P in the first column of the pixel island 102 in the ninth partition Z. Among the first to twelfth transistors M1 to M12, when the third transistor M3, the sixth transistor M6, the eleventh transistor M11 and the twelfth transistor M12 are turned on, and the remaining transistors are turned off, the operational amplifier 104 (i.e., OP1') corresponding to the first column of sub-pixels P in the first column of the pixel island 102 in the ninth partition Z can be reused as the operational amplifier 104 (i.e., OP5') corresponding to the fifth column of sub-pixels P in the first column of pixel island 102 in the ninth partition Z. Among the first to twelfth transistors M1 to M12, when the third transistor M3, the sixth transistor M6, the tenth transistor M10 and the eleventh transistor M11 are turned on, and the remaining transistors are turned off, there is non-reuse between the operational amplifier 104 (i.e., OP1') corresponding to the first column of sub-pixels P in the first column of the pixel island 102 in the ninth partition Z and the operational amplifier 104 (i.e., OP5') corresponding to the fifth column of sub-pixels P in the first column of pixel island 102 in the ninth partition Z.

As can be seen from Table 2-2 and FIG. 8, among the first transistor M1 to the twelfth transistor M12, when the first transistor M1, the second transistor M2, and the seventh transistor M7 are turned on, and the remaining transistors are turned off, the operational amplifier 104 (i.e., OP1') corresponding to the first column of sub-pixels P in the first column of the pixel island 102 in the ninth partition Z can be reused as the operational amplifier 104 (i.e., OP1) corresponding to the first column of sub-pixels P in the first column of the pixel island 102 in the first partition Z. Among the first transistor M1 to the twelfth transistor M12, when the first transistor M1, the third transistor M3 and the tenth transistor M10 are turned on, and the remaining transistors are turned off, the operational amplifier 104 (i.e., OP1) corresponding to the first column of sub-pixels P in the first column of the pixel island 102 in the first partition Z can be reused as the operational amplifier 104 (i.e., OP1') corresponding to the first column of sub-pixels P in the first column of the pixel island 102 in the ninth partition Z.

Among the first to twelfth transistors M1 to M12, when the fourth transistor M4, the fifth transistor M5 and the eighth transistor M8 are turned on, and the remaining transistors are turned off, the operational amplifier 104 (i.e., OP5') corresponding to the fifth column of sub-pixels P in the first column of pixel island 102 in the ninth partition Z can be reused as the operational amplifier 104 (i.e., OP5) corresponding the fifth column of sub-pixels P in the first column of the pixel island 102 in the first partition Z. Among the first transistor M1 to the twelve transistors M12, when the fourth transistor M4, the sixth transistor M6 and the eleventh transistor M11 are turned on, and the remaining transistors are turned off, the operational amplifier 104 (i.e., OP5) corresponding the fifth column of sub-pixels P in the first column of the pixel island 102 in the first partition Z can be reused as the operational amplifier 104 (i.e., OP5') corresponding to the fifth column of sub-pixels P in the first column of pixel island 102 in the ninth partition Z.

Among the first to twelfth transistors M1 to M12, the first transistor M1, the second transistor M2, the fourth transistor M4, the fifth transistor M5, the seventh transistor M7, and the eighth transistor M8 are turned on, and the remaining transistors are turned off, the operational amplifier 104 (i.e., OP1') corresponding to the first column of sub-pixels P in the first column of pixel island 102 in the ninth partition Z can be reused as the operational amplifier 104 (i.e., OP1) corresponding to the first column of sub-pixels P in the first column of pixel island 102 in the first partition Z, and the operational amplifier 104 (i.e., OP5') corresponding to the fifth column of sub-pixels P in the first column of pixel island 102 in the ninth partition Z can be reused as the operational amplifier 104 (i.e., OP5) corresponding the fifth column of sub-pixels P in the first column of the pixel island 102 in the first partition Z. Among the first transistor M1 to the twelfth transistor M12, the first transistor M1, the third transistor M3, the fourth transistor M4, the sixth transistor M6, the tenth transistor M10 and the eleventh transistor M11 are turned on and the remaining transistors are turned off, the operational amplifier 104 (i.e., OP1) corresponding to the first column of sub-pixels P in the first column of the pixel island 102 in the first partition Z can be reused as the operational amplifier 104 (i.e. OP1') corresponding to the first column of sub-pixels P in the first column of pixel island 102 in the ninth partition Z, and the operational amplifier 104 (i.e., OP5) corresponding the fifth column of sub-pixels P in the first column of the pixel island 102 in the first partition Z can be reused as the operational amplifier 104 (i.e., OP5') corresponding to the fifth column of sub-pixels P in the first column of pixel island 102 in the ninth partition Z.

Among the first to twelfth transistors M1 to M12, the second transistor M2, when the third transistor M3, the fifth transistor M5, the sixth transistor M6, the seventh transistor M7, the eighth transistor M8, the tenth transistor M10, and the transistor M11 are turned on, and the other transistors are turned off, none of the operational amplifier 104 (i.e., OP1) corresponding to the first column of sub-pixels P in the first column of the pixel island 102 in the first partition Z, the operational amplifier 104 (i.e., OP5) corresponding to the fifth column of sub-pixels P in the first column of the pixel island 102 in the first partition Z, the operational amplifier 104 (i.e., OP1') corresponding to the first column of sub-pixels P in the first column of the pixel island 102 in the ninth partition Z, and the operational amplifier 104 (i.e., OP5') corresponding to the fifth column of sub-pixels P in the first column of pixel island 102 in the ninth partition Z can be reused.

TABLE 2-1

| | ON/OFF State of Transistor | | | | | |
|---|---|---|---|---|---|---|
| Transistor | Reusing of OP in the first column of pixel island in the first partition | | | Reusing of OP in the first column of pixel island in the ninth partition | | |
| M1 | 0 | 0 | 0 | 0 | 0 | 0 |
| M2 | 1 | 1 | 1 | 0 | 0 | 0 |
| M3 | 0 | 0 | 0 | 1 | 1 | 1 |

TABLE 2-1-continued

| Transistor | Reusing of OP in the first column of pixel island in the first partition | | | Reusing of OP in the first column of pixel island in the ninth partition | | |
|---|---|---|---|---|---|---|
| M4 | 0 | 0 | 0 | 0 | 0 | 0 |
| M5 | 1 | 1 | 1 | 0 | 0 | 0 |
| M6 | 0 | 0 | 0 | 1 | 1 | 1 |
| M7 | 1 | 0 | 1 | 0 | 0 | 0 |
| M8 | 0 | 1 | 1 | 0 | 0 | 0 |
| M9 | 1 | 1 | 0 | 0 | 0 | 0 |
| M10 | 0 | 0 | 0 | 1 | 0 | 1 |
| M11 | 0 | 0 | 0 | 0 | 1 | 1 |
| M12 | 0 | 0 | 0 | 1 | 1 | 0 |
| Working state | OP5 is reused as OP1 | OP1 is reused as OP5 | Non-reuse | OP5' is reused as OP1' | OP1' is reused as OP5' | Non-reuse |

TABLE 2-2

| Transistor | ON/OFF State of Transistor Reusing of OP between the first partition and the ninth partition | | | | | | |
|---|---|---|---|---|---|---|---|
| M1 | 1 | 1 | 0 | 0 | 1 | 1 | 0 |
| M2 | 1 | 0 | 0 | 0 | 1 | 0 | 1 |
| M3 | 0 | 1 | 0 | 0 | 0 | 1 | 1 |
| M4 | 0 | 0 | 1 | 1 | 1 | 1 | 0 |
| M5 | 0 | 0 | 1 | 0 | 1 | 0 | 1 |
| M6 | 0 | 0 | 0 | 1 | 0 | 1 | 1 |
| M7 | 1 | 0 | 0 | 0 | 1 | 0 | 1 |
| M8 | 0 | 0 | 1 | 0 | 1 | 0 | 1 |
| M9 | 0 | 0 | 0 | 0 | 0 | 0 | 0 |
| M10 | 0 | 1 | 0 | 0 | 0 | 1 | 1 |
| M11 | 0 | 0 | 0 | 1 | 0 | 1 | 1 |
| M12 | 0 | 0 | 0 | 0 | 0 | 0 | 0 |
| Working state | OP1' is reused as OP1 | OP1 is reused as OP1' | OP5' is reused as OP5 | OP5 is reused as OP5' | OP1' is reused as OP1; OP5' is reused as OP5 | OP1 is reused as OP1'; OP5 is reused as OP5' | Non-reuse |

Figure 9:
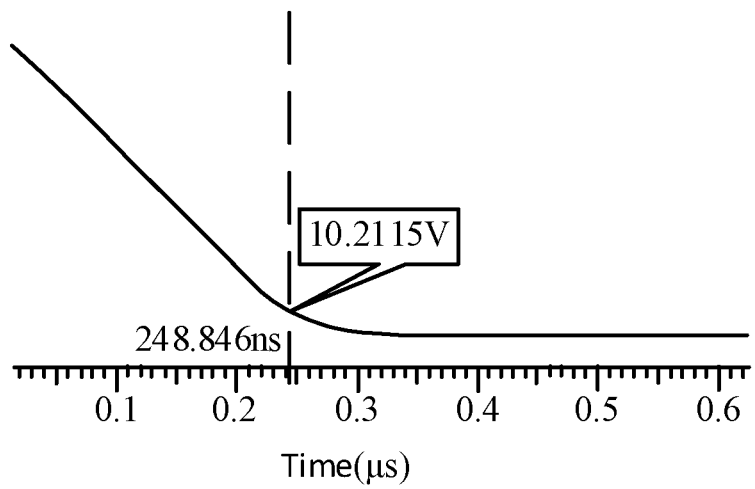
FIG. 9 is a charging simulation diagram using an operational amplifier to provide data signals for sub-pixels in the same column.
Figure 10:
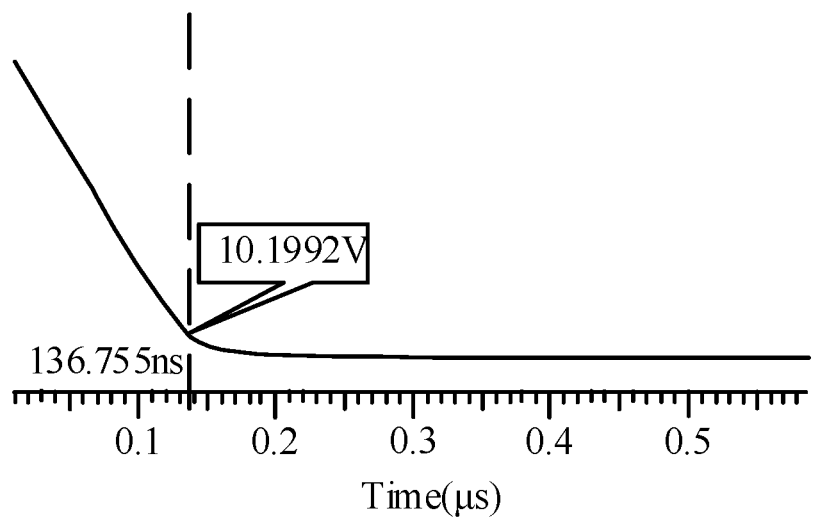
FIG. 10 is a charging simulation diagram using two operational amplifiers to provide data signals to sub-pixels in the same column.

FIG. 9 shows a charging simulation diagram using one operational amplifier 104 to provide data signals for sub-pixels P. FIG. 10 shows a charging simulation diagram using two operational amplifiers 104 (that is, in the case of reusing) to provide data signals for sub-pixels P. By comparison, it can be seen that the time it takes for one operational amplifier 104 to charge to 90% is 243.846 ns, and the time it takes for two operational amplifiers 104 to charge to 90% is reduced to 136.755 ns. Therefore, the present disclosure can reduce the charging time, thereby increasing the charging rate.

Figure 11:
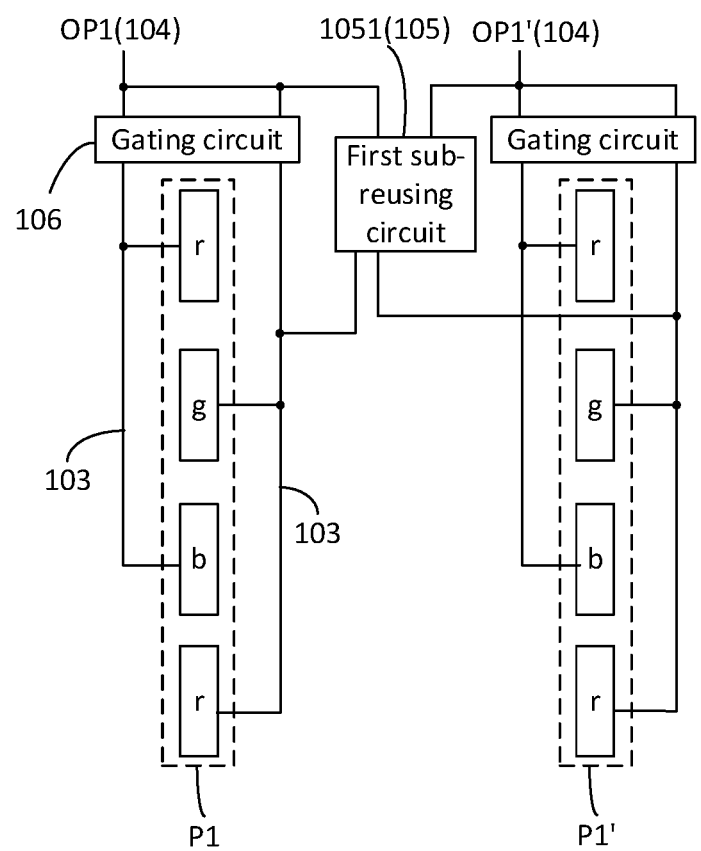
FIG. 11 is another schematic diagram of the reusing of operational amplifiers corresponding to different partitions.
Figure 12:
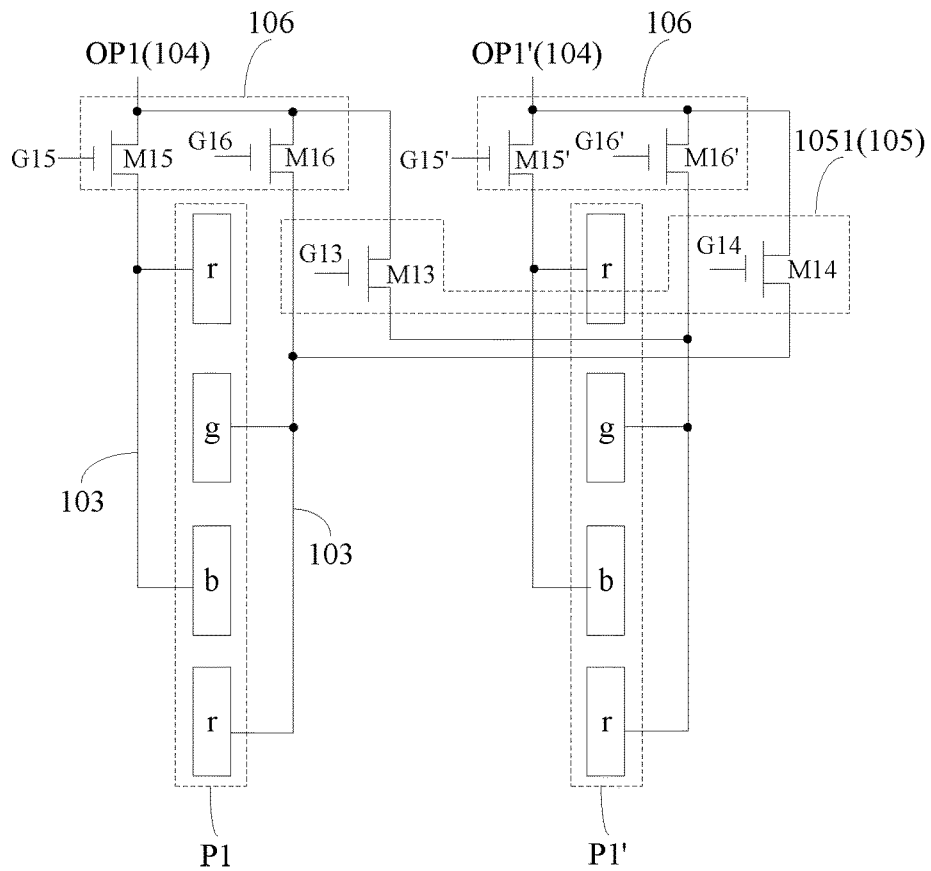
FIG. 12 is a schematic structural diagram of the first sub-reusing circuit and the gating circuit in FIG. 11.

In some embodiments, in the above-mentioned display substrate provided by the embodiments of the present disclosure, as shown in FIGS. 11 and 12, an operational amplifier 104 can be connected to a column of sub-pixels P through two data lines 103. One of the two data lines 103 connects the sub-pixels P in the odd-numbered rows in a column, and the other data line 103 connects the sub-pixels P of the even-numbered rows in the column. In this case, the sub-pixels P electrically connected to each first sub-reusing circuit 1051 are the even-numbered rows of sub-pixels P in the $h^{th}$ column of the $j^{th}$ column of pixel island 102 in the $m^{th}$ partition Z, and the even-numbered rows of sub-pixels P in the $h^{th}$ column of the $j^{th}$ column of pixel island 102 in the $(m+n)^{th}$ partition Z. Therefore, the data signal provided by the operational amplifier 104 corresponding to the $h^{th}$ column of sub-pixels P in the $j^{th}$ column of pixel island 102 in the $m^{th}$ partition Z can be written into the even-numbered rows of sub-pixels P in the $h^{th}$ column of the $j^{th}$ column of pixel island 102 in the $(m+n)^{th}$ partition Z. Alternatively, the data signal provided by the operational amplifier 104 corresponding to the $h^{th}$ column of sub-pixels P in the $j^{th}$ column of pixel island 102 in the $(m+n)^{th}$ partition Z can be written into the even-numbered rows of sub-pixels P in the $h^{th}$ column of the $j^{th}$ column of pixel island 102 in the $m^{th}$ partition Z through the first sub-reusing circuit 1051. This reduces the charging time of a frame, thereby increasing the frame rate. In FIGS. 11 and 12, P1 represents the first column of sub-pixels P in the first column of pixel island 102 in the first partition Z, and P1' represents the first column of sub-pixels P in the first column of pixel island 102 in the ninth partition Z.

In some embodiments, in the above display substrate provided by the embodiments of the present disclosure, as shown in FIG. 12, the first sub-reusing circuit 1051 includes: a thirteenth transistor M13 and a fourteenth transistor M14.

The gate electrode of the thirteenth transistor M13 is electrically connected to the thirteenth control signal terminal G13. The first electrode of the thirteenth transistor M13 is electrically connected to the operation amplifier 104 corresponding to the $h^{th}$ column of sub-pixels P in the $j^{th}$ column of pixel island 102 in the $m^{th}$ partition Z. The second electrode of the thirteenth transistor M13 is electrically connected to the data line 103 corresponding to the even-numbered rows of sub-pixels P of the $h^{th}$ column of the $j^{th}$ column of pixel island 102 in the $(m+n)^{th}$ partition Z.

The gate electrode of the fourteenth transistor M14 is electrically connected to the fourteenth control signal terminal G14. The first electrode of the fourteenth transistor M14 is connected to the operational amplifier 104 corresponding to the $h^{th}$ column of sub-pixels P in the $j^{th}$ column of pixel island 102 in the $(m+n)^{th}$ partition Z. The second electrode of the fourteenth transistor M14 is electrically connected to the data line 103 corresponding to the even-numbered rows of sub-pixels P in the $h^{th}$ column of the $j^{th}$ column of pixel island 102 in the $m^{th}$ partition Z.

In some embodiments, the above display substrate provided by the embodiments of the present disclosure, as shown in FIG. 11 or 12, may also include a plurality of gating circuits 106 located in the frame area BB. Each gating circuit 106 is connected to the operational amplifier 104 and two data lines 103 corresponding to the operational amplifier 104. The gating circuit 106 can cooperate with the first sub-reusing circuit 105 to realize different row reusing of the operational amplifiers 104 in different partitions Z.

In some embodiments, in the above display substrate provided by the embodiments of the present disclosure, as shown in FIG. 12, the gating circuit 106 may include a fifteenth transistor M15 and a sixteenth transistor M16.

The gate of the fifteenth transistor M15 is electrically connected to the fifteenth control signal terminal G15. The first electrode of the fifteenth transistor M15 is electrically connected to an operational amplifier 104. The second electrode of the fifteenth transistor M15 is electrically connected to one of the two data lines 103.

The gate of the sixteenth transistor M16 is electrically connected to the sixteenth control signal terminal G16. The first electrode of the sixteenth transistor M16 is electrically connected to an operational amplifier 104, and the second electrode of the sixteenth transistor M16 is electrically connected to the other one of the two data lines.

Taking the display substrate provided by the present disclosure as having a total of 16 partitions Z, each partition Z having 30 columns of pixel islands 102, and each pixel island 102 having 16 sub-pixels P, as an example, in the display substrate shown in FIGS. 11 and 12, the total number of transistors included in the first sub-reusing circuit 1051 and the gating circuit 106 is "6 (the number of transistors corresponding to each two columns of sub-pixels)×16 (16 partitions)×30 (30 pixel islands in one partition)×8 (8 groups of sub-pixels in each pixel island)=23040". If the display status of sub-pixels P in the respective partitions Z is the same, "6 (the number of transistors corresponding to each two columns of sub-pixels)×16 (16 partitions)×8 (8 groups of sub-pixels in each pixel island)=768" control signal terminals are required to determine the switching (ON/OFF) state of the transistors.

For example, FIG. 12 shows that the first column of sub-pixels P in the first column of the pixel island 102 in the first partition Z are electrically connected to the first sub-reusing circuit 1051 through two data lines 103 and a gate circuit 106. The first column of sub-pixels P in the first column of the pixel island 102 in the ninth partition Z are electrically connected to the same first sub-reusing circuit 1051 through two data lines 103 and another gate circuit 106.

In some embodiments, '1' represents a high-level signal and '0' represents a low-level signal. Each transistor is turned on under a high-level signal and turned off under a low-level signal. It should be noted that '1' and '0' are logic levels, which are only used to better explain the working process of the embodiments of the present disclosure, rather than are the voltages applied to the gate of each transistor during implementations.

Table 3 exemplarily shows when each transistor in FIG. 12 is applied with different logic levels, the working state of the operational amplifier 104 (i.e., OP1) corresponding to the first column of sub-pixels P of the first column of pixel island 102 in the first partition Z, and the working state of the operational amplifier 104 (i.e., OP1') corresponding to the first column of sub-pixels P in the first column of the pixel island 102 in the ninth partition Z.

It can be seen from Table 3 and FIG. 12 that when the fourteenth transistor M14 and the fifteenth transistor M15 in the gating circuit 106 corresponding to the first column of sub-pixels P in the first column of pixel island 102 in the first partition Z are turned on, the sixteenth transistor M16 in the gating circuit 106 corresponding to the first column of sub-pixels P in the first column of the pixel island 102 in the first partition Z, the fifteenth transistor M15 (i.e., M15' in Table 3) and the sixteenth transistor M16 (i.e., M16' in Table 3) in the gating circuit 106 corresponding to the first column of sub-pixels P in the first column of pixel island 102 in the ninth partition Z are turned off, the operational amplifier 104 (i.e., OP1') corresponding to the first column of sub-pixels P in the first column of the pixel island 102 in the ninth partition Z can be reused as the operational amplifier 104 (i.e., OP1) corresponding to the even-numbered rows of sub-pixels P in the first column of pixel island 102 in the first partition Z.

When the thirteenth transistor M13 and the fifteenth transistor M15 (i.e., M15') in the gating circuit 106 corresponding to the first column of sub-pixels P in the first column of pixel island 102 in the ninth partition Z are turned on, the fifteenth transistor M15 and the sixteenth transistor M16 in the gating circuit 106 corresponding to the first column of sub-pixels P in the first column of pixel island 102 in the first partition Z, and the sixteenth transistor M16 (i.e., M16') in the gating circuit 106 corresponding to the first column of sub-pixels P in the first column of pixel island 102 in the ninth partition Z are is turned off, the operational amplifier 104 (i.e., OP1) corresponding to the first column of sub-pixels P of the first column of pixel island 102 in the first partition Z can be reused as the operational amplifier 104 (i.e., OP1') corresponding to the even-numbered row of sub-pixels P in the first column of the pixel island 102 in the ninth partition Z.

It should be noted that when the operational amplifiers 104 (OP1 and OP1') are reused, it is necessary to load the gate scanning signal (Gate) to the odd-numbered row of sub-pixels P and the subsequent even-numbered row of sub-pixels P simultaneously to reduce one frame charging time, thereby increasing frame rate.

When the fifteenth transistor M15 and the sixteenth transistor M16 in the gate circuit 106 corresponding to the first column of the sub-pixels P in the first column of the pixel island 102 in the first partition Z, and the fifteenth transistor M15 (i.e., M15') and the sixteenth transistor M16 (i.e., M16') in the gating circuit 106 corresponding to the first column of sub-pixels P in the first column of the pixel island 102 in the ninth partition Z are turned on, and the thirteenth transistor M13 and the fourteenth transistor M14 are turned off, the operational amplifier 104 (i.e., OP1) corresponding to the even-numbered rows of sub-pixels P in the first column of the pixel island 102 in the first partition Z, and the operational amplifier 104 (i.e., OP1') corresponding to the even-numbered rows of sub-pixels P in the first column of the pixel island 102 in the ninth partition Z cannot be reused. Furthermore, the fifteenth transistor M15 in the gate circuit 106 corresponding to the first column of the sub-pixels P in the first column of the pixel island 102 in the first partition Z, and the fifteenth transistor M15 (i.e., M15') in the gating circuit 106 corresponding to the first column of the sub-pixels P in the first column of the pixel island 102 in the ninth partition Z are both turned on, so that data signals of the operational amplifier 104 (i.e., OP1) corresponding to the first column of sub-pixels P in the first column of pixel island 102 in the first partition Z, and data signals of the operational amplifier 104 (i.e. OP1') corresponding to the first column of sub-pixels P in the first column of pixel island 102 in the ninth partition Z are sent to the odd-numbered rows of sub-pixels P. The sixteenth transistor M16 in the gating circuit 106 corresponding to the first column of sub-pixels P in the first column of pixel island 102 in the first partition Z, and the sixteenth transistor M16 (i.e., M16') in the gating circuit 106 corresponding to the first column of sub-pixels P of the first column of pixel island 102 in the ninth partition Z are both turned on, so that data signals of the operational amplifier 104 (i.e., OP1) corresponding to the first column of sub-pixels P in the first column of pixel island 102 in the first partition Z, and data signals of the operational amplifier 104 (i.e. OP1') corresponding to the first column of sub-pixels P in the first column of pixel island 102 in the ninth partition Z are sent to the even-numbered rows of sub-pixels P.

TABLE 3

| Transistor | ON/OFF State of Transistor | | |
|---|---|---|---|
| M13 | 0 | 1 | 0 |
| M14 | 1 | 0 | 0 |
| M15 | 1 | 0 | 1 |
| M16 | 0 | 0 | 1 |
| M15' | 0 | 1 | 1 |
| M16' | 0 | 0 | 1 |
| Working state | OP1' is reused as OP1 | OP1 is reused as OP1' | Non-reuse |

Figure 13:
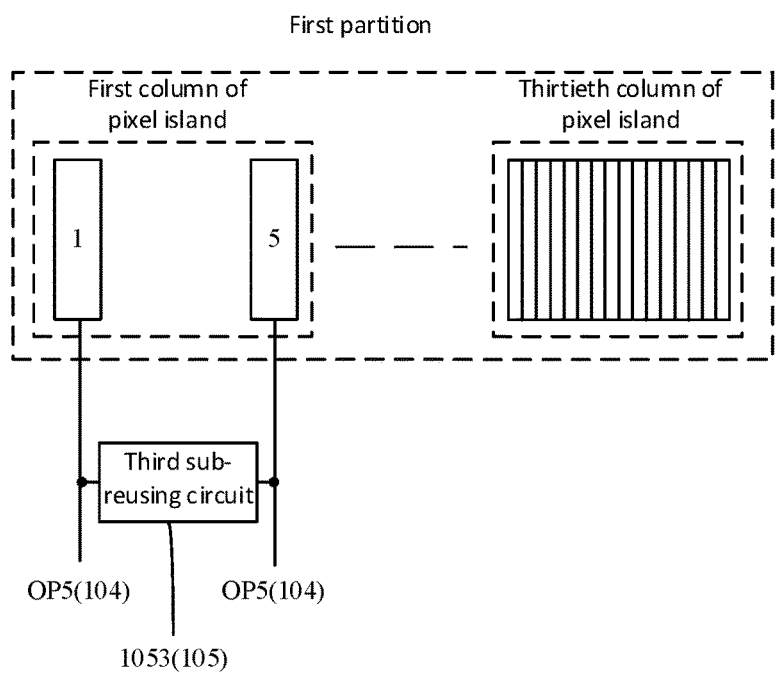
FIG. 13 is a schematic diagram of a reusing of operational amplifiers corresponding to part of sub-pixels in FIG. 6.

In some embodiments, in the above display substrate provided by the embodiments of the present disclosure, as shown in FIG. 13, k sub-pixels P are arranged in a single row of each pixel island 102, and k is a multiple of 4. The reusing circuit 105 includes a third sub-reusing circuits 1053. Sub-pixels P electrically connected to the third sub-reusing circuit 1053 are the sub-pixels P of the $h^{th}$ column and the sub-pixels P of the $(h+k/4)^{th}$ column in the same column of pixel island 102. h is an integer greater than or equal to 1 and less than or equal to k/4, and an integer greater than or equal to (1+k/4) and less than or equal to (k−4); such that the operational amplifier 104 corresponding to the $h^{th}$ column of sub-pixels P in one column of pixel island 102 and the operational amplifier 104 corresponding to the $(h+k/4)^{th}$ column of sub-pixels P in the same one column of pixel island 102 can be reused with each other, which is beneficial to simplifying the wiring design.

Figure 14:
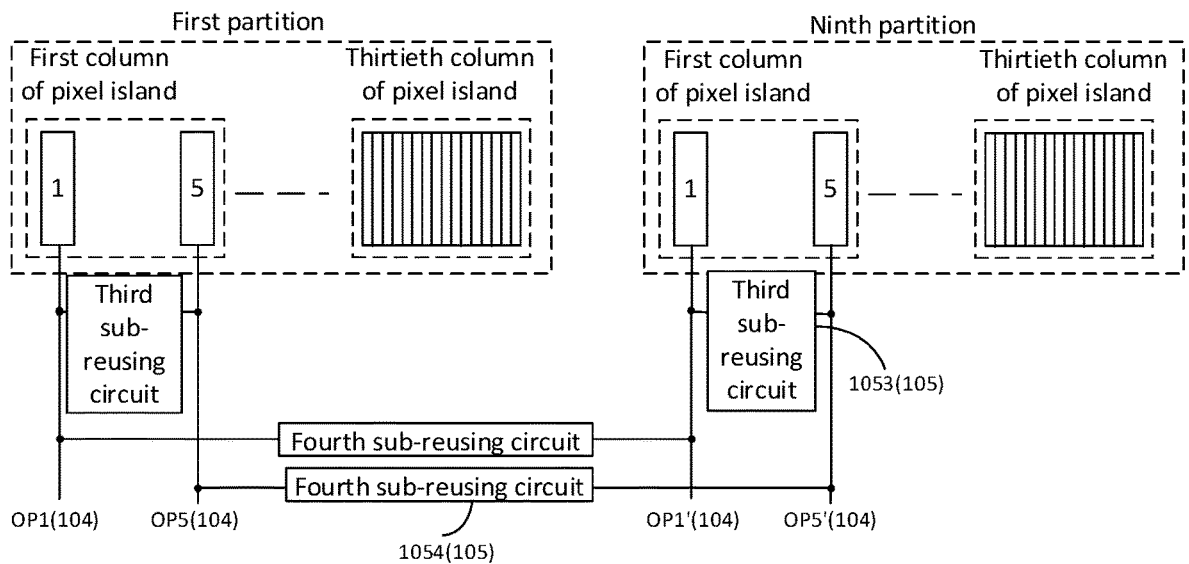
FIG. 14 is a schematic diagram of the reusing of operational amplifiers corresponding to different sub-pixels in the same pixel island together with the reusing of operational amplifiers corresponding to different partitions.

In some embodiments, in the above display substrate provided by the embodiments of the present disclosure, as shown in FIGS. 2, 3 and 14, each adjacent i columns of pixel islands 102 in the row direction X forms one partition Z, and there are 2n partitions Z in the row direction X, where i is an integer greater than or equal to 2, and n is a positive integer. The reusing circuit 105 further includes a fourth sub-reusing circuit 1054. The fourth sub-reusing circuit 1054 connects sub-pixels P which are in the same column (e.g., the $h^{th}$ column) of the same column (e.g., the $j^{th}$ column, j is an integer greater than or equal to 1, and less than or equal to i) of pixel island 102 respectively in the $m^{th}$ and $(m+n)^{th}$ partitions Z. m is an integer greater than or equal to 1 and less than or equal to n. This arrangement not only enables the mutual reusing of the operational amplifiers 104 corresponding to the sub-pixels P of same column in the pixel island 102 of same column in the $m^{th}$ partition Z and the $(m+n)^{th}$ partition Z, but also simplifies wiring.

Figure 15:
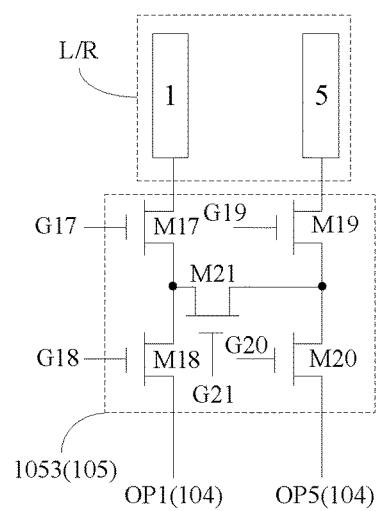
FIG. 15 is a schematic structural diagram of the third sub-reusing circuit in FIG. 13.

In some embodiments, in the above display substrate provided by the embodiments of the present disclosure, as shown in FIGS. 15 and 16, the third sub-reusing circuit 1053, connecting the $h^{th}$ column of sub-pixels P and the $(h+k/4)^{th}$ column of sub-pixels P in the $j^{th}$ column of pixel island 102 in the $m^{th}$ partition Z, includes a seventeenth transistor M17, an eighteenth transistor M18, a nineteenth transistor M19, a twentieth transistor M20 and a twenty-first transistor M21, j is an integer greater than or equal to 1 and less than or equal to i.

The third sub-reusing circuit 1053, connecting the $h^{th}$ column of sub-pixels P and the $(h+k/4)^{th}$ column of sub-pixels P in the $j^{th}$ column of pixel island 102 in the $(m+n)^{th}$ partition Z, includes a twenty-second transistor M22, a twenty-third transistor M23, a twenty-fourth transistor M24, a twenty-fifth transistor M25 and the twenty-sixth transistor M26.

The fourth sub-reusing circuit 1054 connecting the $h^{th}$ column of sub-pixels P in the $j^{th}$ column of pixel island 102 in the $m^{th}$ partition Z and the $h^{th}$ column of sub-pixels P of the $j^{th}$ column of pixel island 102 in the $(m+n)^{th}$ partition Z includes a twenty-seventh transistor M27.

The fourth sub-reusing circuit 1054 connecting the $(h+k/4)^{th}$ column of sub-pixels P in the $j^{th}$ column of pixel island 102 in the $m^{th}$ partition Z and the $(h+k/4)^{th}$ column of sub-pixels P of the $j^{th}$ column of pixel island 102 in the $(m+n)^{th}$ partition Z includes the twenty-eighth transistor M28.

The gate of the seventeenth transistor M17 is electrically connected to the seventeenth control signal terminal G17. The first electrode of the seventeenth transistor M17 is electrically connected to the second electrode of the eighteenth transistor M18. The second electrode of the seventeenth transistor M17 is electrically connected to the data line 103 corresponding to the $h^{th}$ column of sub-pixels P in the $j^{th}$ column of pixel island 102 in the $m^{th}$ partition Z.

The gate electrode of the eighteenth transistor M18 is electrically connected to the eighteenth control signal terminal G18. The first electrode of the eighteenth transistor M18 is electrically connected to the operation amplifier 104 corresponding to the $h^{th}$ column of sub-pixels P in the $j^{th}$ column of pixel island 102 in the $m^{th}$ partition Z.

The gate of the nineteenth transistor M19 is electrically connected to the nineteenth control signal terminal G19. The first electrode of the nineteenth transistor M19 is electrically connected to the second electrode of the twentieth transistor M20, and the second electrode of the nineteenth transistor M19 is electrically connected to the data line 103 corresponding to the $(h+k/4)^{th}$ column of sub-pixels P in the $j^{th}$ column of pixel island 102 in the $m^{th}$ partition Z.

The gate of the twentieth transistor M20 is electrically connected to the twentieth control signal terminal G20. The first electrode of the twentieth transistor M20 is electrically connected to the operational amplifier 104 corresponding to the $(h+k/4)^{th}$ column of sub-pixels P in the $j^{th}$ column of pixel island 102 in the $m^{th}$ partition Z.

The gate of the twenty-first transistor M21 is electrically connected to the twenty-first control signal terminal G21. The first electrode of the twenty-first transistor M21 is electrically connected to the second electrode of the twentieth transistor M20. The second electrode of the twenty-first transistor M21 is electrically connected to the second electrode of the eighteenth transistor M18.

The gate of the twenty-second transistor M22 is electrically connected to the twenty-second control signal terminal G22. The first electrode of the twenty-second transistor M22 is electrically connected to the second electrode of the twenty-third transistor M23. The second electrode of M22 is electrically connected to the data line 103 corresponding to the $h^{th}$ column of sub-pixels P in the $j^{th}$ column of pixel island 102 in the $(m+n)^{th}$ partition Z.

The gate electrode of the twenty-third transistor M23 is electrically connected to the twenty-third control signal terminal G23. The first electrode of the twenty-third transistor M23 is electrically connected to the operational amplifier 104 corresponding to the $h^{th}$ column of sub-pixels P in the $j^{th}$ column of pixel island 102 in the $(m+n)^{th}$ partition Z.

The gate of the twenty-fourth transistor M24 is electrically connected to the twenty-fourth control signal terminal G24. The first electrode of the twenty-fourth transistor M24 is electrically connected to the second electrode of the twenty-fifth transistor M25. The second electrode of the twenty-fourth transistor M24 is electrically connected to the data line 103 corresponding to the $(h+k/4)^{th}$ column of sub-pixels P in the $j^{th}$ column of pixel island 102 in the $(m+n)^{th}$ partition Z.

The gate electrode of the twenty-fifth transistor M25 is electrically connected to the twenty-fifth control signal terminal G25. The first electrode of the twenty-fifth transistor M25 is electrically connected to the operational amplifier 104 corresponding to the $(h+k/4)^{th}$ column of sub-pixels P in the $j^{th}$ column of pixel island 102 in the $(m+n)^{th}$ partition Z.

The gate of the twenty-sixth transistor M26 is electrically connected to the twenty-sixth control signal terminal G26. The first electrode of the twenty-sixth transistor M26 is electrically connected to the second electrode of the twenty-fifth transistor M25. The second electrode of the twenty-sixth transistor M26 is electrically connected to the second electrode of the twenty-third transistor M23.

The gate electrode of the twenty-seventh transistor M27 is electrically connected to the twenty-seventh control signal terminal G27. The first electrode of the twenty-seventh transistor M27 is electrically connected to the operational amplifier 104 corresponding to the $h^{th}$ column of sub-pixels P in the $j^{th}$ column of pixel island 102 in the $(m+n)^{th}$ partition Z. The second electrode of the twenty-seventh transistor M27 is electrically connected to the operational amplifier 104 corresponding to the $h^{th}$ column of sub-pixels P in the $j^{th}$ column of pixel island 102 in the $m^{th}$ partition Z.

The gate electrode of the twenty-eighth transistor M28 is electrically connected to the twenty-eighth control signal terminal G28. The first electrode of the twenty-eighth transistor M28 is electrically connected to the operational amplifier 104 corresponding to the $(h+k/4)^{th}$ column of sub-pixels P in the $j^{th}$ column of pixel island 102 in the $(m+n)^{th}$ partition Z. The second electrode of the twenty-eighth transistor M28 is electrically connected to the operational amplifier 104 corresponding to the $(h+k/4)^{th}$ column of sub-pixels P in the $j^{th}$ column of pixel island 102 in the $m^{th}$ partition Z.

Taking the display substrate provided by the present disclosure as having a total of 16 partitions Z, each partition Z having 30 columns of pixel islands 102, and each pixel island 102 having 16 sub-pixels P as an example, the total number of transistors included in the third sub-reusing circuits 1053 as shown in FIGS. 13 and 15, is "5 (the number of transistors included in each third sub-reusing circuit 1051)×8 (8 groups of sub-pixel columns in each pixel island)×30 (30 pixel islands in each partition)×16 (16 partitions)=19200". If the display status of the sub-pixels P in the respective partitions Z is the same, "5 (the number of transistors included in each third sub-reusing circuit 1051)×8 (8 groups of sub-pixel columns in each pixel island)×16 (16 partitions)=640" control signal terminals are required to determine the switching state of the transistors. The total number of transistors included in the third sub-reusing circuits 1053 and the fourth sub-reusing circuits 1054 in the display substrate shown in FIGS. 14 and 16 is "12 (the number of transistors included in two third sub-reusing circuits 1053 and two fourth sub-reusing circuits)×8 (8 groups in each pixel island)×30 (30 pixel islands in each partition)×8 (8 groups of partitions)=23040". If the display status of the sub-pixels P in the respective partitions Z is the same, "12 (the number of transistors included in the two third sub-reusing circuits 1053 and the two fourth sub-reusing circuits 1054)×8 (8 groups in each pixel island)×8 (8 groups of partitions)=768" control signal terminals are required to determine the switching state of the transistors.

For example, FIG. 15 shows that the first column of sub-pixels P and the fifth column of sub-pixels P in the first column of pixel island 102 in the first partition Z are electrically connected to the same third sub-reusing circuit 1053.

In some embodiments, '1' represents a high-level signal and '0' represents a low-level signal. Each transistor is turned on under a high-level signal and turned off under a low-level signal. It should be noted that '1' and '0' are logic levels, which are only used to better explain the working process of the embodiments of the present disclosure, rather than are the voltages applied to the gate of each transistor during implementations.

Table 4 exemplarily shows when each transistor in FIG. 15 is applied with different logic levels, the working state of the operational amplifier 104 (i.e., OP1) corresponding to the first column of sub-pixels P in the first column of pixel island 102 in the first partition Z, and the working state of the operational amplifier 104 (i.e., OP5) corresponding to the fifth column of sub-pixels P in the first column of pixel island 102 in the first partition Z.

It can be seen from Table 4 and FIG. 15 that when the seventeenth transistor M17, the eighteenth transistor M18, the twentieth transistor M20 and the twenty-first transistor M21 are turned on, and the nineteenth transistor M19 is turned off, the operational amplifier 104 (i.e., OP5) corresponding to the fifth column of sub-pixels P in the first column of the pixel island 102 in the first partition Z can be reused as the operational amplifier 104 (i.e., OP1) corresponding to the first column of sub-pixels P in the first column of the pixel island 102 in the first partition Z. When the eighteenth transistor M18, the nineteenth transistor M19, the twentieth transistor M20, and the twenty-first transistor M21 are turned on, and the seventeenth transistor M17 is turned off, the operational amplifier 104 (i.e., OP1) corresponding to the first column of sub-pixels P in the first column of the pixel island 102 in the first partition Z can be reused as the operational amplifier 104 (i.e., OP5) corresponding to the fifth column of sub-pixels P in the first column of the pixel island 102 in the first partition Z. When the seventeenth transistor M17, the eighteenth transistor M18, the nineteenth transistor M19 and the twentieth transistor M20 are turned on, and the twenty-first transistor M21 is turned off, the operational amplifier 104 (i.e., OP1) corresponding to the first column of sub-pixels P in the first column of the pixel island 102 in the first partition Z, and the operational amplifier 104 (i.e., OP5) corresponding to the fifth column of sub-pixels P in the first column of the pixel island 102 in the first partition Z cannot be reused.

TABLE 4

| Transistor | ON/OFF State of Transistor | | |
|---|---|---|---|
| M17 | 1 | 0 | 1 |
| M18 | 1 | 1 | 1 |
| M19 | 0 | 1 | 1 |
| M20 | 1 | 1 | 1 |
| M21 | 1 | 1 | 0 |
| Working state | OP5 is reused as OP1 | OP1 is reused as OP5 | Non-reuse |

Table 5-1 and Table 5-2 exemplarily show when each transistor in FIG. 16 is applied with different logic levels, the working state of the operational amplifier 104 (i.e., OP1) corresponding to the first column of sub-pixels P in the first column of pixel island 102 in the first partition Z, the working state of the operational amplifier 104 (i.e., OP1') corresponding to the first column of sub-pixels P in the first column of pixel island 102 in the ninth partition Z; the working state of the operational amplifier 104 (i.e., OP5) corresponding to the fifth column of sub-pixels P in the first column of pixel island 102 in the first partition Z, the working state of the operational amplifier 104 (i.e., OP5') corresponding to the fifth column of sub-pixels P in the first column of pixel island 102 in the ninth partition Z; the working state of the operational amplifiers 104 (i.e., OP1 and OP5) corresponding to the first and fifth columns of sub-pixels P in the first column of pixel island 102 in the first partition Z, and the working state of the operational amplifier 104 (i.e., OP1' and OP5') corresponding to the first and fifth columns of sub-pixels P in the first column of pixel island 102 in the ninth partition Z.

It can be seen from Table 5-1 and FIG. 16 that among the seventeenth transistor M17 to the twenty-eighth transistor M28, when the seventeenth transistor M17, the eighteenth transistor M18, the twentieth transistor M20 and the twenty-first transistor M21 are turned on, the remaining transistors are turned off, the operational amplifier 104 (i.e., OP5) corresponding to the fifth column of sub-pixels P in the first column of the pixel island 102 in the first partition Z can be reused as the operational amplifier 104 (i.e., OP1) corresponding to the first column of sub-pixels P in the first column of the pixel island 102 in the first partition Z. Among the seventeenth to twenty-eighth transistors M17 to M28, when the eighteenth transistor M18, the nineteenth transistor M19, the twentieth transistor M20 and the twenty-first transistor M21 are turned on and the remaining transistors are turned off, the operational amplifier 104 (i.e., OP1) corresponding to the first column of sub-pixels P in the first column of the pixel island 102 in the first partition Z can be reused as the operational amplifier 104 (i.e., OP5) corresponding to the fifth column of sub-pixels P in the first column of the pixel island 102 in the first partition Z. Among the seventeenth transistor M17 to the twenty-eighth transistor M28, when the seventeenth transistor M17, the eighteenth transistor M18, and the nineteenth transistor M19 and the twentieth transistor M20 are turned on and the remaining transistors are turned off, the operational amplifier 104 (i.e., OP1) corresponding to the first column of sub-pixels P in the first column of the pixel island 102 in the first partition Z and the operational amplifier 104 (i.e., OP5) corresponding to the fifth column of sub-pixels P in the first column of the pixel island 102 in the first partition Z cannot be reused.

Among the seventeenth transistor M17 to the twenty-eighth transistor M28, when the twenty-second transistor M22, the twenty-third transistor M23, the twenty-fifth transistor M25, and the twenty-sixth transistor M26 are turned on, and the remaining transistors are turned off, the operational amplifier 104 (i.e., OP5') corresponding to the fifth column of sub-pixels P in the first column of the pixel island 102 in the ninth partition Z can be reused as the operational amplifier 104 (i.e., OP1') corresponding to the first column of sub-pixels P in the first column of the pixel island 102 in the ninth partition Z. Among the seventeenth to twenty-eighth transistors M17 to M28, when the twenty-third transistor M23, the twenty-fourth transistor M24, the twenty-fifth transistor M25 and the twenty-sixth transistor M26 are turned on and the remaining transistors are turned off, the operational amplifier 104 (i.e., OP1') corresponding to the first column of sub-pixels P in the first column of the pixel island 102 in the ninth partition Z can be reused as the operational amplifier 104 (i.e., OP5') corresponding to the fifth column of sub-pixels P in the first column of the pixel island 102 in the ninth partition Z. Among the seventeenth to twenty-eighth transistors M17 to M28, when the twenty-second transistor M22, the twenty-third transistor M23, the twentieth-fourth transistors M24 and the twenty-fifth transistor M25 are turned on, and the remaining transistors are turned off, the operational amplifier 104 (i.e., OP1') corresponding to the first column of sub-pixels P in the first column of the pixel island 102 in the ninth partition Z and the operational amplifier 104 (i.e., OP5') corresponding to the fifth column of sub-pixels P in the first column of the pixel island 102 in the ninth partition Z cannot be reused.

It can be seen from Table 5-2 and FIG. 16 that among the seventeenth transistor M17 to the twenty-eighth transistor M28, when the seventeenth transistor M17, the eighteenth transistor M18 and the twenty-seventh transistor M27 are turned on, and the remaining transistors are turned off, the operational amplifier 104 (i.e., OP1') corresponding to the first column of sub-pixels P in the first column of pixel island 102 in the ninth partition Z can be reused as the operational amplifier 104 (i.e., OP1) corresponding to the first column of sub-pixels P in the first column of pixel island 102 in the first partition Z. Among the seventeenth transistor M17 to the twenty-eighth transistor M28, when the twenty-second transistor M22, the twenty-third transistor M23 and the twenty-seventh transistor M27 are turned on, and the remaining transistors are turned off, the operational amplifier 104 (i.e., OP1) corresponding to the first column of sub-pixels P in the first column of the pixel island 102 in the first partition Z can be reused as the operational amplifier 104 (i.e., OP1') corresponding to the first column of sub-pixels P in the first column of the pixel island 102 in the ninth partition Z.

Among the seventeenth transistor M17 to the twenty-eighth transistor M28, when the nineteenth transistor M19, the twentieth transistor M20 and the twenty-eighth transistor M28 are turned on, and the remaining transistors are turned off, the operational amplifier 104 (i.e., OP5') corresponding to the fifth column of sub-pixels P in the first column of the pixel island 102 in the ninth partition Z can be reused as the operational amplifier 104 (i.e., OP5) corresponding to the fifth column of sub-pixels P in the first column of the pixel island 102 in the first partition Z. Among the seventeenth transistor M17 to the twenty-eighth transistor M28, when the twenty-fourth transistor M24, the twenty-fifth transistor M25 and the twenty-eighth transistor M28 are turned on, and the remaining transistors are turned off, the operational amplifier 104 (i.e., OP5) corresponding to the fifth column of sub-pixels P in the first column of the pixel island 102 in the first partition Z can be reused as the operational amplifier 104 (i.e., OP5') corresponding to the fifth column of sub-pixels P in the first column of the pixel island 102 in the ninth partition.

Among the seventeenth transistor M17 to the twenty-eighth transistor M28, when the seventeenth transistor M17, the eighteenth transistor M18, the nineteenth transistor M19, the twentieth transistor M20, the twenty-seventh transistor M27, and the twenty-eighth transistor M28 are turned on, and the remaining transistors are turned off, the operational amplifier 104 (i.e., OP1') corresponding to the first column of sub-pixels P in the first column of pixel island 102 in the ninth partition Z can be reused as the operational amplifier 104 (i.e., OP1) corresponding to the first column of sub-pixels P in the first column of the pixel island 102 in the first partition Z, and the operational amplifier 104 (i.e., OP5') corresponding to the fifth column of sub-pixels P in the first column of the pixel island 102 in the ninth partition Z can be reused as the operational amplifier 104 (i.e., OP5) corresponding to the fifth column of sub-pixels P in the first column of the pixel island 102 in the first partition Z. Among the seventeenth transistor M17 to the twenty-eighth transistor M28, when the twenty-second transistor M22, the second When the thirteenth transistor M23, the twenty-fourth transistor M24, the twenty-fifth transistor M25, the twenty-seventh transistor M27 and the twenty-eighth transistor M28 are turned on, and the remaining transistors are turned off, the operational amplifier 104 (i.e., OP1) corresponding to the first column of sub-pixels P in the first column of the pixel island 102 in the first partition Z can be reused as the operational amplifier 104 (i.e., OP1') corresponding to the first column of sub-pixels P in the first column of the pixel island 102 in the ninth partition Z, and the operational amplifier 104 (i.e., OP5) corresponding to the fifth column of sub-pixels P in the first column of the pixel island 102 in the first partition Z can be reused as the operational amplifier 104 (i.e., OP5') corresponding to the fifth column of sub-pixels P in the first column of the pixel island 102 in the ninth partition Z.

Among the seventeenth transistor M17 to the twenty-eighth transistor M28, when the seventeenth transistor M17, the eighteenth transistor M18, the nineteenth transistor M19, the twentieth transistor M20, the twenty-second transistor M22, the twenty-third transistor M23, the twenty-fourth transistor M24 and the twenty-fifth transistor M25 are turned on, and the remaining transistors are turned off, the operational amplifier 104 (i.e., OP1) corresponding to the first column of sub-pixels P in the first column of the pixel island 102 in the first partition Z, the operational amplifier 104 (i.e., OP5) corresponding to the fifth column of sub-pixels P in the first column of the pixel island 102 in the first partition Z, the operational amplifier 104 (i.e., OP1') corresponding to the first column of sub-pixels P in the first column of the pixel island 102 in the ninth partition Z and the operational amplifier 104 (i.e., OP5') corresponding to the fifth column of sub-pixels P in the first column of the pixel island 102 in the ninth partition cannot be reused.

TABLE 5-1

| | ON/OFF State of Transistor | | | | | |
|---|---|---|---|---|---|---|
| Transistor | Reusing of OP in the first column of pixel island in the first partition | | | Reusing of OP in the first column of pixel island in the ninth partition | | |
| M17 | 1 | 0 | 1 | 0 | 0 | 0 |
| M18 | 1 | 1 | 1 | 0 | 0 | 0 |
| M19 | 0 | 1 | 1 | 0 | 0 | 0 |
| M20 | 1 | 1 | 1 | 0 | 0 | 0 |
| M21 | 1 | 1 | 0 | 0 | 0 | 0 |
| M22 | 0 | 0 | 0 | 1 | 0 | 1 |
| M23 | 0 | 0 | 0 | 1 | 1 | 1 |
| M24 | 0 | 0 | 0 | 0 | 1 | 1 |
| M25 | 0 | 0 | 0 | 1 | 1 | 1 |
| M26 | 0 | 0 | 0 | 1 | 1 | 0 |
| M27 | 0 | 0 | 0 | 0 | 0 | 0 |
| M28 | 0 | 0 | 0 | 0 | 0 | 0 |
| Working state | OP5 is reused as OP1 | OP2 is reused as OP5 | Non-reuse | OP5' is reused as OP1' | OP1' is reused as OP5' | Non-reuse | pixel island 102 in the first partition Z can be reused as the

TABLE 5-2

| | ON/OFF State of Transistor | | | | | | |
|---|---|---|---|---|---|---|---|
| Transistor | OP Reusing between the first partition and ninth partition | | | | | | |
| M17 | 1 | 0 | 0 | 0 | 1 | 0 | 1 |
| M18 | 1 | 0 | 0 | 0 | 1 | 0 | 1 |
| M19 | 0 | 0 | 1 | 0 | 1 | 0 | 1 |
| M20 | 0 | 0 | 1 | 0 | 1 | 0 | 1 |
| M21 | 0 | 0 | 0 | 0 | 0 | 0 | 0 |
| M22 | 0 | 1 | 0 | 0 | 0 | 1 | 1 |
| M23 | 0 | 1 | 0 | 0 | 0 | 1 | 1 |
| M24 | 0 | 0 | 0 | 1 | 0 | 1 | 1 |
| M25 | 0 | 0 | 0 | 1 | 0 | 1 | 1 |
| M26 | 0 | 0 | 0 | 0 | 0 | 0 | 0 |
| M27 | 1 | 1 | 0 | 0 | 1 | 1 | 0 |
| M28 | 0 | 0 | 1 | 1 | 1 | 1 | 0 |
| Working | OP1' is | OP1 is | OP5' is | OP5 is | OP1' is reused | OP1 is reused | Non- |

TABLE 5-2-continued

| Transistor | ON/OFF State of Transistor OP Reusing between the first partition and ninth partition | | | | | | |
| --- | --- | --- | --- | --- | --- | --- | --- |
| state | reused as OP1 | reused as OP1' | reused as OP5 | reused as OP5' | as OP1; OP5' is reused as OP5 | as OP1'; OP5 is reused as OP5' | reuse |

It should be noted that in the embodiments of the present disclosure, each transistor may be a top-gate transistor or a bottom-gate transistor, which is not limited here. Alternatively, each transistor may be a field effect transistor, a low temperature polysilicon transistor, an amorphous silicon transistor, an oxide transistor, etc. In addition, the first electrode and the second electrode of each transistor are the drain electrode and the source electrode, and are not distinguished here.

In some embodiments, the above-mentioned display substrate provided by the embodiments of the present disclosure may also include a source driver chip (Source IC) located in the frame area BB. The plurality of gate circuits 106, the plurality of reusing circuits 105, and the plurality of operational amplifiers 104 may be integrated in the source driver chip to reduce the loss (RC loading) of the data signal on the transmission path from the source driver chip to the sub-pixels P. It should be understood that when the operational amplifiers 104 are reused among the partitions Z, compared to the case where the operational amplifiers 104 are reused within the pixel island 102, the wiring distance between the two operational amplifiers 104 among partitions Z is longer. Therefore, it is suitable to integrate the gate circuits 106, the reusing circuits 105, and the operational amplifiers 104 in the source driver chip. When the operational amplifiers 104 are reused within the pixel island 102, the wiring distance between the two operational amplifiers 104 is relatively short. In this case, the gate circuits 106, the reusing circuits 105, and the operational amplifiers 104 can be integrated into the source driver chip; or the gate circuits 106, the reusing circuits 105, and the operational amplifiers 104 can also be fabricated on the display substrate, which is not specifically limited here.

Based on the same inventive concept, embodiments of the present disclosure provide a driving method for the above-mentioned display substrate. Since the principle of solving the problem of this driving method is similar to the principle of solving the problem of the above-mentioned display substrate, the implementations of the driving method provided by the embodiments of the present disclosure can be referred to the implementations of the above-mentioned display substrate provided by the embodiments of the present disclosure, and repeated details will not be described again.

For example, embodiments of the present disclosure provide a driving method for the above-mentioned display substrate, as shown in FIG. 17, including the following steps.

S1701. In the reusing mode, controlling the reusing circuit to conduct one of the data lines that are electrically connected to the reusing circuit, and disconnecting the other data lines that are electrically connected to the reusing circuit, so that data signals output by at least two operational amplifiers are provided to sub-pixels in the same column that is electrically connected to the one data line through the reusing circuit and data line that are connected.

S1702. In the non-reusing mode, controlling the reusing circuit to disconnect all data lines electrically connected to the reusing circuit, so as to provide the data signal output by each operational amplifier to each column of sub-pixels electrically connected to each operational amplifier in a one-to-one correspondence.

Based on the same inventive concept, embodiments of the disclosure provide a display device, including the above display substrate provided by embodiments of the disclosure. Since the principle of solving the problem of the display device is similar to the principle of solving the problem of the above-mentioned display substrate, the implementations of the display device provided by the embodiments of the present disclosure can be referred to the implementations of the above-mentioned display substrate provided by the embodiments of the present disclosure, and the duplication will not be repeated.

In some embodiments, the above-mentioned display device provided by the embodiments of the present disclosure may be: a mobile phone, a tablet computer, a television, a monitor, a notebook computer, a digital photo frame, a navigator, a smart watch, a fitness wristband, a personal digital assistant, or any other device with a product or component that has display functionality. The display device includes but is not limited to: a radio frequency unit, a network module, an audio output & input unit, a sensor, a display unit, a user input unit, an interface unit, a memory, a processor, a power supply and other components. In addition, those skilled in the art can understand that the above structure does not constitute a limitation on the above display device provided by the embodiments of the present disclosure. In other words, the above display device provided by the embodiments of the present disclosure may include more or less of the above components, or combinations of certain components, or different arrangements of components.

Obviously, those skilled in the art can make various changes and modifications to the disclosed embodiments without departing from the spirit and scope of the disclosed embodiments. In this way, if these modifications and variations of the embodiments of the present disclosure fall within the scope of the claims of the present disclosure and equivalent technologies, the present disclosure is also intended to include these modifications and variations.

What is claimed is:

1. A display substrate, comprising:
a base substrate comprising a display area and a frame area located on at least one side of the display area;
a plurality of pixel islands arranged in an array in the display area; wherein each pixel island comprises a plurality of sub-pixels arranged in an array;
a plurality of data lines extending along a column direction and arranged along a row direction in the display area, the plurality of data lines being electrically connected to the sub-pixels;
a plurality of operational amplifiers located in the frame area; wherein each operational amplifier is electrically connected to a column of sub-pixels through the data line;

a plurality of reusing circuits located in the frame area;
wherein each reusing circuit is connected to at least two operational amplifiers, and sub-pixels electrically connected to each reusing circuit through data lines are located in at least two columns;
wherein at least two adjacent columns of pixel islands in the row direction form a partition; each reusing circuit comprises a first sub-reusing circuit, and sub-pixels electrically connected to each first sub-reusing circuit are located in at least two partitions;
each first sub-reusing circuit is connected among two operational amplifiers and among data lines to which the two operational amplifiers are electrically connected, and the sub-pixels electrically connected to each first sub-reusing circuit are in two partitions;
wherein there are 2n partitions in the row direction, n is a positive integer; first to $n^{th}$ partitions arranged continuously are a watching area, and $(n+1)^{th}$ to $2n^{th}$ partitions arranged continuously are a non-watching area; the sub-pixels electrically connected to each first sub-reusing circuit are located in the $m^{th}$ and $(m+n)^{th}$ partitions, wherein m is an integer greater than or equal to 1 and less than or equal to n; wherein a refresh rate of the watching area is greater than a refresh rate of the non-watching area;
each partition comprises i columns of pixel islands, each pixel island comprises k sub-pixels arranged in a single row, i is an integer greater than or equal to 2, and k is an even number;
the sub-pixels electrically connected to each first sub-reusing circuit are at least part of sub-pixels in a $h^{th}$ column of the sub-pixels in the $j^{th}$ column of the pixel island in the $m^{th}$ partition, and at least part of sub-pixels in a $h^{th}$ column of the sub-pixels in the $j^{th}$ column of the pixel island in the $(m+n)^{th}$ partition, wherein j is an integer greater than or equal to 1 and less than or equal to i, and h is an integer greater than or equal to 1 and less than or equal to k.

2. The display substrate of claim 1, wherein one of the data lines is connected between one of the operational amplifiers and one column of the sub-pixels;
wherein the sub-pixels electrically connected to each first sub-reusing circuit are the sub-pixels in the $h^{th}$ column of the $j^{th}$ column of the pixel island in the $m^{th}$ partition, and the sub-pixels in the $h^{th}$ column of the $j^{th}$ column of the pixel island in the $(m+n)^{th}$ partition.

3. The display substrate according to claim 2, wherein each reusing circuit further comprises a second sub-reusing circuit;
each second sub-reusing circuit is connected between two columns of sub-pixels in a same column of pixel island and between two first sub-reusing circuits corresponding to the two columns of sub-pixels.

4. The display substrate according to claim 3, wherein k is a multiple of 4, h is an integer greater than or equal to 1 and less than or equal to k/4, and an integer greater than or equal to (1+k/4) and less than or equal to (k−4);
each second sub-reusing circuit is electrically connected to sub-pixels in a $h^{th}$ column and a $(h+k/4)^{th}$ column of a same column of pixel island, respectively.

5. The display substrate according to claim 4, wherein each first sub-reusing circuit which is connected to the $h^{th}$ column of sub-pixels in the $j^{th}$ column of pixel island in the $m^{th}$ partition and the $h^{th}$ column of sub-pixels in the $j^{th}$ column of pixel island in the $(m+n)^{th}$ partition, comprises a first transistor, a second transistor and a third transistor;

each first sub-reusing circuit which is connected to a $(h+k/4)^{th}$ column of sub-pixels in the $j^{th}$ column of pixel island in the $m^{th}$ partition and a $(h+k/4)^{th}$ column of sub-pixels in the $j^{th}$ column of pixel island in the $(m+n)^{th}$ partition, comprises a fourth transistor, a fifth transistor and a sixth transistor;
each second sub-reusing circuit which is connected to the $h^{th}$ and $(h+k/4)^{th}$ columns of sub-pixels in the $j^{th}$ column of pixel island in the $m^{th}$ partition, comprises a seventh transistor, a eighth transistor and a ninth transistor;
each second sub-reusing circuit which is connected to the $h^{th}$ and $(h+k/4)^{th}$ columns of sub-pixels in the $j^{th}$ column of pixel island in the $(m+n)^{th}$ partition, comprises a tenth transistor, an eleventh transistor and a twelfth transistor;
wherein a gate electrode of the first transistor is electrically connected to a first control signal terminal, a first electrode of the first transistor is connected to an operational amplifier corresponding to the $h^{th}$ column of sub-pixels in the $j^{th}$ column of pixel island in the $(m+n)^{th}$ partition, and a second electrode of the first transistor is electrically connected to an operational amplifier corresponding to the $h^{th}$ column of sub-pixels in the $j^{th}$ column of pixel island in the $m^{th}$ partition;
a gate electrode of the second transistor is electrically connected to a second control signal terminal, a first electrode of the second transistor is electrically connected to the second electrode of the first transistor, and a second electrode of the second transistor is electrically connected to a first electrode of the seventh transistor;
a gate electrode of the third transistor is electrically connected to a third control signal terminal, a first electrode of the third transistor is electrically connected to the first electrode of the first transistor, and a second electrode of the third transistor is electrically connected to a first electrode of the tenth transistor;
a gate electrode of the fourth transistor is electrically connected to a fourth control signal terminal, and a first electrode of the fourth transistor is electrically connected to an operational amplifier corresponding to the $(h+k/4)^{th}$ column of sub-pixels in the $j^{th}$ column of pixel island in the $(m+n)^{th}$ partition, and a second electrode of the fourth transistor is electrically connected to an operational amplifier corresponding to the $(h+k/4)^{th}$ column of sub-pixels in the $j^{th}$ column of pixel island in the $m^{th}$ partition;
a gate electrode of the fifth transistor is electrically connected to a fifth control signal terminal, a first electrode of the fifth transistor is electrically connected to the second electrode of the fourth transistor, and a second electrode of the fifth transistor is electrically connected to a first electrode of the eighth transistor;
a gate electrode of the sixth transistor is electrically connected to a sixth control signal terminal, a second electrode of the sixth transistor is electrically connected to a first electrode of the eleventh transistor, and a first electrode of the sixth transistor is electrically connected to the first electrode of the fourth transistor;
a gate electrode of the seventh transistor is electrically connected to a seventh control signal terminal, and a second electrode of the seventh transistor is electrically connected to a data line corresponding to the $h^{th}$ column of sub-pixels in the $j^{th}$ column of pixel island in the $m^{th}$ partition;

a gate electrode of the eighth transistor is electrically connected to an eighth control signal terminal, and a second electrode of the eighth transistor is electrically connected to a data line corresponding to the $(h+k/4)^{th}$ column of sub-pixels in the $j^{th}$ column of pixel island in the $m^{th}$ partition;

a gate electrode of the ninth transistor is electrically connected to a ninth control signal terminal, a first electrode of the ninth transistor is electrically connected to the second electrode of the fifth transistor, and a second electrode of the ninth transistor is electrically connected to the second electrode of the second transistor;

a gate electrode of the tenth transistor is electrically connected to a tenth control signal terminal, and a second electrode of the tenth transistor is electrically connected to a data line corresponding to the $h^{th}$ column of sub-pixels in the $j^{th}$ column of pixel island in the $(m+n)^{th}$ partition;

a gate electrode of the eleventh transistor is electrically connected to an eleventh control signal terminal, and a second electrode of the eleventh transistor is electrically connected to a data line corresponding to the $(h+k/4)^{th}$ column of sub-pixels in the $j^{th}$ column of pixel island in the $(m+n)^{th}$ partition;

a gate of the twelfth transistor is electrically connected to a twelfth control signal terminal, a first electrode of the twelfth transistor is electrically connected to the second electrode of the sixth transistor, and a second electrode of the twelfth transistor is electrically connected to the second electrode of the third transistor.

6. The display substrate according to claim 3, wherein each single row in each pixel island is arranged with k sub-pixels, and k is a multiple of 4;

each reusing circuit comprises a third sub-reusing circuit, and sub-pixels electrically connected to the third sub-reusing circuit are sub-pixels in a $h^{th}$ and a $(h+k/4)^{th}$ columns of a same column of pixel island, wherein h is an integer greater than or equal to 1 and less than or equal to k/4, and an integer greater than or equal to (1+k/4) and less than or equal to (k−4).

7. The display substrate according to claim 6, wherein each adjacent i column of the pixel islands in the row direction forms a partition, and there are 2n partitions in the row direction, i is an integer greater than or equal to 2, n is a positive integer;

each reusing circuit further comprises a fourth sub-reusing circuit, and the fourth sub-reusing circuit connects sub-pixels which are in a same column of a same column of pixel island in the $m^{th}$ partition and sub-pixels which are in the same column of the same column of pixel island in the $(m+n)^{th}$ partition, wherein m is an integer greater than or equal to 1 and less than or equal to n.

8. The display substrate according to claim 7, wherein each third sub-reusing circuit connecting the $h^{th}$ column of sub-pixels and $(h+k/4)^{th}$ column of sub-pixels in the $j^{th}$ column of pixel island in the $m^{th}$ partition, comprises a seventeenth transistor, an eighteenth transistor, a nineteenth transistor, a twentieth transistor and a twenty-first transistor, j is an integer greater than or equal to 1 and less than or equal to i;

each third sub-reusing circuit connecting the $h^{th}$ column of sub-pixels and $(h+k/4)^{th}$ column of sub-pixels in the $j^{th}$ column of pixel island in the $(m+n)^{th}$ partition, comprises a twenty-second transistor, a twenty-third transistor, a twenty-fourth transistor, a twenty-fifth transistor and a twenty-sixth transistor;

each fourth sub-reusing circuit connecting the $h^{th}$ column of sub-pixels in the $j^{th}$ column of pixel island in the $m^{th}$ partition and the $h^{th}$ column of sub-pixels in the $j^{th}$ column of pixel island in the $(m+n)^{th}$ partition, comprises a twenty-seventh transistor;

each fourth sub-reusing circuit connecting the $(h+k/4)^{th}$ column of sub-pixels in the $j^{th}$ column of pixel island in the $m^{th}$ partition and the $(h+k/4)^{th}$ column of sub-pixels in the $j^{th}$ column of pixel island in the $(m+n)^{th}$ partition, comprises a twenty-eighth transistor;

wherein a gate electrode of the seventeenth transistor is electrically connected to a seventeenth control signal terminal, a first electrode of the seventeenth transistor is electrically connected to a second electrode of the eighteenth transistor, and the second electrode of the seventeenth transistor is electrically connected to a data line corresponding to the $h^{th}$ column of sub-pixels in the $j^{th}$ column of pixel island in the $m^{th}$ partition;

a gate electrode of the eighteenth transistor is electrically connected to an eighteenth control signal terminal, and a first electrode of the eighteenth transistor is electrically connected to an operational amplifier corresponding to the $h^{th}$ column of sub-pixels in the $j^{th}$ column of pixel island in the $m^{th}$ partition;

a gate of the nineteenth transistor is electrically connected to a nineteenth control signal terminal, a first electrode of the nineteenth transistor is electrically connected to a second electrode of the twentieth transistor, and a second electrode of the nineteenth transistor is electrically connected to a data line corresponding to the $(h+k/4)^{th}$ column of sub-pixels in the $j^{th}$ column of pixel island in the $m^{th}$ partition;

a gate electrode of the twentieth transistor is electrically connected to a twentieth control signal terminal, and a first electrode of the twentieth transistor is electrically connected to an operational amplifier corresponding to the $(h+k/4)^{th}$ column of sub-pixels in the $j^{th}$ column of pixel island in the $m^{th}$ partition;

a gate of the twenty-first transistor is electrically connected to a twenty-first control signal terminal, a first electrode of the twenty-first transistor is electrically connected to a second electrode of the twentieth transistor, and a second electrode of the twenty-first transistor is electrically connected to the second electrode of the eighteenth transistor;

a gate of the twenty-second transistor is electrically connected to a twenty-second control signal terminal, a first electrode of the twenty-second transistor is electrically connected to a second electrode of the twenty-third transistor, and a second electrode of the twenty-second transistor is electrically connected to a data line corresponding to the $h^{th}$ column of sub-pixels in the $j^{th}$ column of pixel island in the $(m+n)^{th}$ partition;

a gate electrode of the twenty-third transistor is electrically connected to a twenty-third control signal terminal, and a first electrode of the twenty-third transistor is electrically connected to an operational amplifier corresponding to the $h^{th}$ column of sub-pixels in the $j^{th}$ column of pixel island in the $(m+n)^{th}$ partition;

a gate of the twenty-fourth transistor is electrically connected to a twenty-fourth control signal terminal, a first electrode of the twenty-fourth transistor is electrically connected to a second electrode of the twenty-fifth transistor, and the second electrode of the twenty-fourth transistor is electrically connected to a data line corresponding to the $(h+k/4)^{th}$ column of sub-pixels in the $j^{th}$ column of pixel island in the $(m+n)^{th}$ partition;
a gate electrode of the twenty-fifth transistor is electrically connected to a twenty-fifth control signal terminal, and a first electrode of the twenty-fifth transistor is electrically connected to an operational amplifier corresponding to the $(h+k/4)^{th}$ column of sub-pixels in the $j^{th}$ column of pixel island in the $(m+n)^{th}$ partition;
a gate of the twenty-sixth transistor is electrically connected to a twenty-sixth control signal terminal, a first electrode of the twenty-sixth transistor is electrically connected to a second electrode of the twenty-fifth transistor, and a second electrode of the twenty-sixth transistor is electrically connected to the second electrode of the twenty-third transistor;
a gate electrode of the twenty-seventh transistor is electrically connected to a twenty-seventh control signal terminal, and a first electrode of the twenty-seventh transistor is electrically connected to an operational amplifier corresponding to the $h^{th}$ column of sub-pixels in the $j^{th}$ column of pixel island in the $(m+n)^{th}$ partition, and a second electrode of the twenty-seventh transistor is electrically connected to an operational amplifier corresponding to the $h^{th}$ column of sub-pixels in the $j^{th}$ column of pixel island in the $m^{th}$ partition;
a gate electrode of the twenty-eighth transistor is electrically connected to a twenty-eighth control signal terminal, and a first electrode of the twenty-eighth transistor is electrically connected to an operational amplifier corresponding to the $(h+k/4)^{th}$ column of sub-pixels in the $j^{th}$ column of pixel island in the $(m+n)^{th}$ partition, and a second electrode of the twenty-eighth transistor is electrically connected to an operational amplifier corresponding to the $(h+k/4)^{th}$ column of sub-pixels in the $j^{th}$ column of pixel island in the $m^{th}$ partition.

9. The display substrate according to claim 1, wherein two data lines are connected between one operational amplifier and one column of sub-pixels, and one of the two data lines is connected to odd-numbered rows of sub-pixels in the one column, the other one of the two data lines is connected to even-numbered rows of sub-pixels in the one column.

10. The display substrate according to claim 9, wherein sub-pixels electrically connected to each first sub-reusing circuit are even-numbered rows of sub-pixels in the $h^{th}$ column of the $j^{th}$ column of pixel island in the $m^{th}$ partition, and even-numbered rows of sub-pixels in the $h^{th}$ column of the $j^{th}$ column of pixel island in the $(m+n)^{th}$ partition.

11. The display substrate according to claim 10, wherein each first sub-reusing circuit comprises: a thirteenth transistor and a fourteenth transistor;
wherein a gate electrode of the thirteenth transistor is electrically connected to a thirteenth control signal terminal, a first electrode of the thirteenth transistor is electrically connected to an operational amplifier corresponding to the $h^{th}$ column of sub-pixels in the $j^{th}$ column of pixel island in the $m^{th}$ partition, and a second electrode of the thirteenth transistor is electrically connected to a data line corresponding to the even-numbered rows of sub-pixels in the $h^{th}$ column of the $j^{th}$ column of pixel island in the $(m+n)^{th}$ partition;
a gate electrode of the fourteenth transistor is electrically connected to a fourteenth control signal terminal, a first electrode of the fourteenth transistor is electrically connected to an operational amplifier corresponding to the $h^{th}$ column of sub-pixels in the $j^{th}$ column of pixel island in the $(m+n)^{th}$ partition, and a second electrode of the fourteenth transistor is electrically connected to a data line corresponding to the even-numbered rows of sub-pixels in the $h^{th}$ column of the $j^{th}$ column of pixel island in the $m^{th}$ partition.

12. The display substrate according to claim 9, further comprising a plurality of gating circuits in the frame area;
each gating circuit is connected among one operational amplifier and two data lines corresponding to the one operational amplifier.

13. The display substrate according to claim 12, wherein each gating circuit comprises a fifteenth transistor and a sixteenth transistor;
wherein a gate of the fifteenth transistor is electrically connected to a fifteenth control signal terminal, a first electrode of the fifteenth transistor is electrically connected to the one operational amplifier, and a second electrode of the fifteenth transistor is electrically connected to one of the two data lines;
a gate of the sixteenth transistor is electrically connected to a sixteenth control signal terminal, a first electrode of the sixteenth transistor is electrically connected to the one operational amplifier, and a second electrode of the sixteenth transistor is electrically connected to the other one of the two data lines.

14. The display substrate according to claim 12, further comprising a source driver chip in the frame area, wherein the source driver chip comprises the plurality of gate circuits, the plurality of reusing circuits, and the plurality of operational amplifiers.

15. A method for driving the display substrate according to claim 1, comprising:
in a reusing mode, controlling the reusing circuit to conduct one of the data lines that are electrically connected to the reusing circuit, and disconnecting the other data lines that are electrically connected to the reusing circuit, so that data signals output by at least two operational amplifiers are provided to sub-pixels in a same column that are electrically connected to the conducted one data line through the reusing circuit and the conducted one data line;
in a non-reusing mode, controlling the reusing circuit to disconnect all data lines electrically connected to the reusing circuit, so as to provide each data signal output by each operational amplifier to each column of sub-pixels electrically connected to each operational amplifier in a one-to-one correspondence.

* * * * *